United States Patent
Muhn et al.

(10) Patent No.: US 11,137,010 B2
(45) Date of Patent: Oct. 5, 2021

(54) INTEGRAL TRUSS PLATE CONNECTOR

(71) Applicants: Dustin P. Muhn, San Francisco, CA (US); Thomas G. Evans, Dublin, CA (US); Timothy M. Stauffer, Pleasant Hill, CA (US); Sam Thomas Hensen, Pleasanton, CA (US); Lloyd Shawn Overholtzer, Rancho Murieta, CA (US)

(72) Inventors: Dustin P. Muhn, San Francisco, CA (US); Thomas G. Evans, Dublin, CA (US); Timothy M. Stauffer, Pleasant Hill, CA (US); Sam Thomas Hensen, Pleasanton, CA (US); Lloyd Shawn Overholtzer, Rancho Murieta, CA (US)

(73) Assignee: Simpson Strong-Tie Company, Inc., Pleasanton, CA (US)

( * ) Notice: Subject to any disclaimer, the term of this patent is extended or adjusted under 35 U.S.C. 154(b) by 440 days.

(21) Appl. No.: 15/330,867

(22) Filed: Nov. 7, 2016

(65) Prior Publication Data
US 2017/0130755 A1      May 11, 2017

Related U.S. Application Data

(60) Provisional application No. 62/252,385, filed on Nov. 6, 2015.

(51) Int. Cl.
*E04B 1/26*     (2006.01)
*F16B 15/00*    (2006.01)
(Continued)

(52) U.S. Cl.
CPC ........ *F16B 15/0046* (2013.01); *E04B 1/1903* (2013.01); *E04B 1/2604* (2013.01);
(Continued)

(58) Field of Classification Search
CPC ............ Y10T 403/42; Y10T 403/4602; Y10T 403/73; F16B 15/0046; E04B 1/2612; E04B 1/2608
See application file for complete search history.

(56) References Cited

U.S. PATENT DOCUMENTS

| 409,546 A | 8/1889 | Ziegler |
|---|---|---|
| 3,416,821 A | 12/1968 | Benno |

(Continued)

FOREIGN PATENT DOCUMENTS

| AU | 61049/90 | 2/1991 |
|---|---|---|
| AU | 200056480 B3 | 2/2001 |

(Continued)

OTHER PUBLICATIONS

"Re-Defining the Standard: Plated Truss Connectors, Angles and Straps." USP Lumber Connectors Full Line Catalog 2000. Three pages including cover page. USP Structural Connectors, 2000, USA.

(Continued)

*Primary Examiner* — Michael P Ferguson
(74) *Attorney, Agent, or Firm* — Charles R. Cypher; James R. Cypher

(57) ABSTRACT

A connection is formed between a held member and a holding member with the use of a connector and one or more fasteners. In one aspect, the connector has a main body that has integral nail prong fasteners. In one aspect, the main body of the connector is attached to the held and holding members by means of double-shear fastening. In one aspect, the main body is formed with a bendable end flange to attach the connector to the holding member. In one aspect, the main body is formed with a nail guide for directing the fastener at an angle to the main body.

13 Claims, 21 Drawing Sheets

(51) Int. Cl.
*E04B 1/19* (2006.01)
*E04C 3/12* (2006.01)

(52) U.S. Cl.
CPC ............ *E04B 1/2608* (2013.01); *E04C 3/125* (2013.01); *E04B 2001/2644* (2013.01); *E04B 2001/2652* (2013.01); *E04B 2001/2676* (2013.01); *Y10T 403/42* (2015.01); *Y10T 403/4602* (2015.01)

(56) References Cited

U.S. PATENT DOCUMENTS

| | | | |
|---|---|---|---|
| 3,601,428 A * | 8/1971 | Gilb | E04B 1/2608 248/217.3 |
| 3,945,741 A | 3/1976 | Wendt | |
| 4,198,175 A | 4/1980 | Knepp et al. | |
| 4,291,996 A | 9/1981 | Gilb | |
| 4,297,048 A | 10/1981 | Jureit et al. | |
| 4,411,548 A | 10/1983 | Tschan | |
| 4,455,805 A | 6/1984 | Rionda et al. | |
| 4,480,941 A | 11/1984 | Gilb et al. | |
| 4,498,801 A | 2/1985 | Gilb | |
| 4,555,887 A | 12/1985 | Rionda et al. | |
| 4,560,301 A | 12/1985 | Gilb | |
| 4,561,230 A * | 12/1985 | Rionda | E04B 1/2612 403/232.1 |
| 5,004,369 A | 4/1991 | Young | |
| 5,071,280 A | 12/1991 | Turner | |
| 5,160,211 A | 11/1992 | Gilb | |
| 5,380,116 A | 1/1995 | Colonias | |
| 5,419,649 A | 5/1995 | Gilb | |
| 5,457,928 A | 10/1995 | Sahnazarian | |
| 5,531,052 A | 7/1996 | Agar | |
| 5,603,580 A | 2/1997 | Leek | |
| 5,735,087 A | 4/1998 | Olden | |
| 5,896,716 A | 4/1999 | Jalla | |
| 5,950,392 A | 9/1999 | Short, V et al. | |
| 6,112,495 A | 9/2000 | Gregg et al. | |
| 6,158,188 A | 12/2000 | Shahnazarian | |
| 6,171,043 B1 | 1/2001 | Williams | |
| 6,254,306 B1 * | 7/2001 | Williams | E04B 1/2403 403/403 |
| 6,308,469 B1 | 10/2001 | Leung | |
| 6,375,379 B1 | 4/2002 | Jefferies | |
| 6,401,422 B1 | 6/2002 | Olden | |
| 6,523,321 B1 | 2/2003 | Leek et al. | |
| 6,536,179 B2 | 3/2003 | Little | |
| 6,698,971 B1 | 3/2004 | Wilhelmi | |
| 6,931,804 B2 | 8/2005 | Trarup et al. | |
| 7,021,879 B2 | 4/2006 | Taneichi | |
| 7,200,972 B1 | 4/2007 | Freeman et al. | |
| 2003/0009980 A1 * | 1/2003 | Shahnazarian | E04B 1/2608 52/712 |
| 2006/0191233 A1 | 8/2006 | Tamlyn | |
| 2009/0301026 A1 | 12/2009 | Kaczmarek et al. | |

FOREIGN PATENT DOCUMENTS

| | | | |
|---|---|---|---|
| CA | 502492 | 5/1954 | |
| DE | 29610381 U1 | 10/1996 | |
| DE | 29918339 U1 | 2/2000 | |
| DE | 10051793 A1 | 5/2001 | |
| EP | 1167779 A2 | 1/2002 | |
| EP | 1275856 A2 | 1/2003 | |
| FR | 2 867 204 | * 9/2005 | ............... E04B 1/58 |
| GB | 2250795 A | 6/1992 | |
| GB | 2465530 B | 3/2012 | |
| WO | WO 03/093594 A1 | 11/2003 | |

OTHER PUBLICATIONS

EWP Hangers, catalog, 1998, 2 pages, USP706-981, United Steel Products Company, Montgomery, MN, US.

* cited by examiner

000
INTEGRAL TRUSS PLATE CONNECTOR

BACKGROUND

The present invention relates to a connector for joining structural building components, a connection made with such a connector, and a method for using such a connector. In particular, the present invention provides novel ways for connecting two members together with a connector by means of separate fasteners.

There is a wide range of connectors for firmly connecting together various component parts of a structural frame of a house or other building. Such connectors are normally made from steel and closely engage the members to be connected. They are typically formed with holes through which fasteners are driven to attach the connector to the structural members.

A particular sub-set of these connectors are nail plates or truss connector plates that attach to one or more of the members by nail prongs or nailing teeth that are formed by cutting and bending metal from the connector itself. The nail prongs are pressed into the structural members. Nail plates are typically attached at a fabrication factory away from the job site. They are typically pressed into the sides of timber members using special hydraulic tools. As the plate is pressed in, the nail prongs are all "driven" simultaneously and the compression between adjacent nail prongs reduces the tendency of wood members to split. Nail plates are typically used to build wooden trusses used in the construction of roofs and floors in light frame construction. Nail plate connectors are typically substantially flat members and are used to join two abutting structural members by laying the nail plate connector across the joint between the members and pressing the nail prongs of the nail plate connector into both members. While nail plate connectors are typically flat members, there is a wide variety of nail plate connectors of different forms and shapes. In addition to coming in different shapes, some nail plate connectors use a combination of nail prongs and regular fasteners such as nails and screws to join the structural members.

Generally, if a connector is to be fastened to the structural member with nails or screws, openings are formed in the connector at the desired locations for driving the screws or nails through the connector. This makes driving the fastener easier, but it also allows for precisely locating the fasteners. One benefit of using designated fastener openings is that designers can calculate the minimum number of fasteners that are needed for a given load on the connector. Depending on the shape and form of the openings, they can also be used to direct the entry of the fastener at a precise angle to the connector. Another benefit is that the fasteners can be spaced from each other and directed into the wood member at particular locations and angles to avoid splitting the structural member.

In most instances the openings formed in the connector are simple punched openings formed by removing metal from the connector. These simple openings can be shaped as circular openings to closely engage the fastener (which is typically cylindrical) on all sides and minimize the removal of metal for the opening. They can also come in a variety of shapes, such as triangles and squares. Openings with different shapes can be used to indicate the fasteners that are minimally necessary and the fasteners that can be added for additional strength.

The openings can also be formed with walls (typically formed by bending some or all of the material that would normally be removed to make the opening) to help guide the nail in a particular direction or to provide more contact between the nail and the connector.

U.S. Pat. No. 5,071,280 teaches a sheet metal connector having openings with tabs that help guide the nails that are driven through the connector to attach the structural members to each other and to the connector. The tabs are designed to guide nails that are driven at an acute angle through the connector's face and into the structural members rather than at a 90 degree angle to the connector's face. The tabs are formed with pointed tips and the tabs are designed to be pressed into the structural member as the nail is driven. Driving the nail through the openings for the tabs and then along the tabs drives the tabs into the structural member.

U.S. Pat. No. 6,698,971 teaches a concealed connector for fastening structural frame components together, especially a joist to a header. The connector is made with flanges having openings with longitudinal walls that extend into a wood structural member as shown in FIG. 19. It is unknown whether the formed longitudinal walls of the openings are pressed into the wood structural members or cavities are first formed in the wood members to receive the projections formed in association with the openings. These formed openings are also interesting in that the nail is not started at these openings but rather is inserted through a different opening in a different part of the connector, travels through the structural member and then is inserted through these openings.

DE 296 10 381U1 teaches various forms of nail guides.

U.S. Pat. No. 4,198,175 teaches a nail plate connector that is attached to the end of a structural member that has a bendable flange which is bent orthogonally when the member is ready to be attached to another member.

UK Patent Application GB 2250795, published Jun. 17, 1992, teaches nail plate connectors that are used to connect structural members that have bendable flanges for creating additional areas of attachment to the structural members.

The present invention provides a combination of features that is not found in the prior art.

SUMMARY OF THE INVENTION

In one embodiment, the present invention provides a connection between a held member and a holding member, the held member having an end face and one or more longitudinal faces meeting said end face at one or more longitudinal edges of the end face. The holding member has an attachment face with the end face of the held member being in abutting relation or disposed close to the attachment face of the holding member. A connector is used to make the connection, the connector has a main body attached to a longitudinal face of the held member, the main body has integral nail prong fasteners that are embedded in the held member such that the connector is attached to the held member. The connection also includes at least one fastener, wherein, the fastener has a shank and the shank of the fastener passes through the main body of the connector, and also through the held member, such that a portion of the shank of the fastener is embedded in the holding member. According to the present invention, a special opening can be provided that receives the fastener. The opening that receives the angled fastener can be an elongated or obround opening that can easily receive the fastener at a variety of angles. The edge of the opening or portions of the opening can be reinforced with material to strengthen the opening and help guide the fastener.

In another embodiment, the present invention provides a connection between a held member and a holding member, the held member has an end face and one or more longitudinal faces meeting the end face at one or more longitudinal edges of the end face. The holding member has an attachment face with the end face of the held member being in abutting relation or disposed close to the attachment face of the holding member. A connector is used to make the connection, the connector has a main body attached to a longitudinal face of the held member, the main body has integral nail prong fasteners that are embedded in the held member such that the connector is attached to the held member. The main body also has a nail guide, and the nail guide has a guide way protruding from the main body of the connector and a fastener opening associated with the guide way. The connection also includes at least one fastener. The fastener has an elongated, straight shank, the shank of the fastener passes through the fastener opening of the nail guide such that a portion of the shank of the fastener is in contact with the guide way. The guide way positions the shank of the fastener at an acute angle to the main body of the connector.

In another embodiment of the present invention, a connection is provided between a held member and a holding member with the held member having an end face and one or more longitudinal faces meeting the end face at one or more longitudinal edges of the end face. The holding member has an attachment face with the end face of the held member being in abutting relation to the attachment face of the holding member. A connector is provided to make the connection between the held member and the holding member. The connector has a main body attached to a longitudinal face of the held member, the main body has a nail guide and the nail guide has a guide way protruding from the main body of the connector and a fastener opening associated with the guide way. The guide way is formed with a raised embossed portion, the raised embossed portion has first and second bracketing transition areas where at least a portion of the embossed portion is joined to the main body. At least one fastener is also part of the connection. The fastener has a shank, the shank of the fastener passes through the main body of the connector, and also through the held member, such that a portion of the shank of the fastener is embedded in the holding member. The shank of the fastener also passes through the fastener opening of the nail guide such that a portion of the shank of the fastener is in contact with the guide way. The guideway positions the shank of the fastener at an acute angle to the main body of the connector.

In another embodiment of the present invention, a connection is provided between a member and a connector. The member has an end face and one or more longitudinal faces meeting the end face at one or more longitudinal edges of the end face. The connector has a main body attached to a longitudinal face of the held member, the connector also has a bendable, planar end flange connected to the main body and at a first point in time, the end flange is disposed in a first position which is closely adjacent to and parallel with the end face of the member such that the end flange overlies and covers a portion of the end face of the held member, and at a second point in time, the bendable end flange is disposed in a second position where it is parallel with the end face of the member and disposed orthogonal to the main body and it does not overlie the end face of the member.

In another embodiment of the present invention, a method of making a connection is provided wherein, a connector is attached to a held member, the held member having an end face and one or more longitudinal faces meeting the end face at one or more longitudinal edges of the end face, the connector being attached to one of the longitudinal faces, the connector having a main body that interfaces with the longitudinal face of the held member, the main body having a nail guide, the nail guide having a guide way protruding from the main body of the connector and a fastener opening associated with the guide way, the protruding guide way of the nail guide being pressed into the longitudinal face of the held member when the main body of the connector is attached to the held member, such that the guide way of the nail guide is embedded in the held member. The nail guide can be provided with sharp portions or rounded arch or otherwise shaped in a manner to assist in pressing the nail guide into the held member. The held member is then placed against a holding member with the end face of the held member in abutting relation with an attachment face of the holding member. A fastener is then driven through the nail guide of the main body, the fastener having a shank, such that the shank of the fastener first passes through the fastener opening of the nail guide and then through the held member such that a portion of the shank of the fastener is embedded in the holding member.

An object of the present invention is to provide a connector with a main body and an end flange disposed at an angle thereto with both the main body and the end flange being attached to two separate structural members. A further object of the present invention is to provide the main body of the connector with a bendable end flange that can be used to place the main body of the connector at the proper location along the longitudinal face of the held member and then be bent out of the way of the end face of the held member to serve as an additional member that can be attached directly to the holding member. The bendable end flange can be shaped with a number of tab extensions.

An object of the present invention is to provide a connector with a body that is a nail prong plate, allowing it to be attached to the first structural member with the same hydraulic presses used to assemble conventional plated trusses. In one embodiment, at the same time that the nail prongs are embedded in the held member, a nail guide with a projecting guideway is also embedded in the held member.

An object of the present invention is to provide a nail prong plate that doubles as a hanger, allowing a first structural member to be supported by a second structural member through the connector.

BRIEF DESCRIPTION OF THE DRAWINGS

FIG. 11 is a top view of a connector of the present invention. The bottom view is similar.

FIG. 24 is a top view of a connector of the present invention. The bottom view is similar.

DETAILED DESCRIPTION OF THE INVENTION

Figure 1:
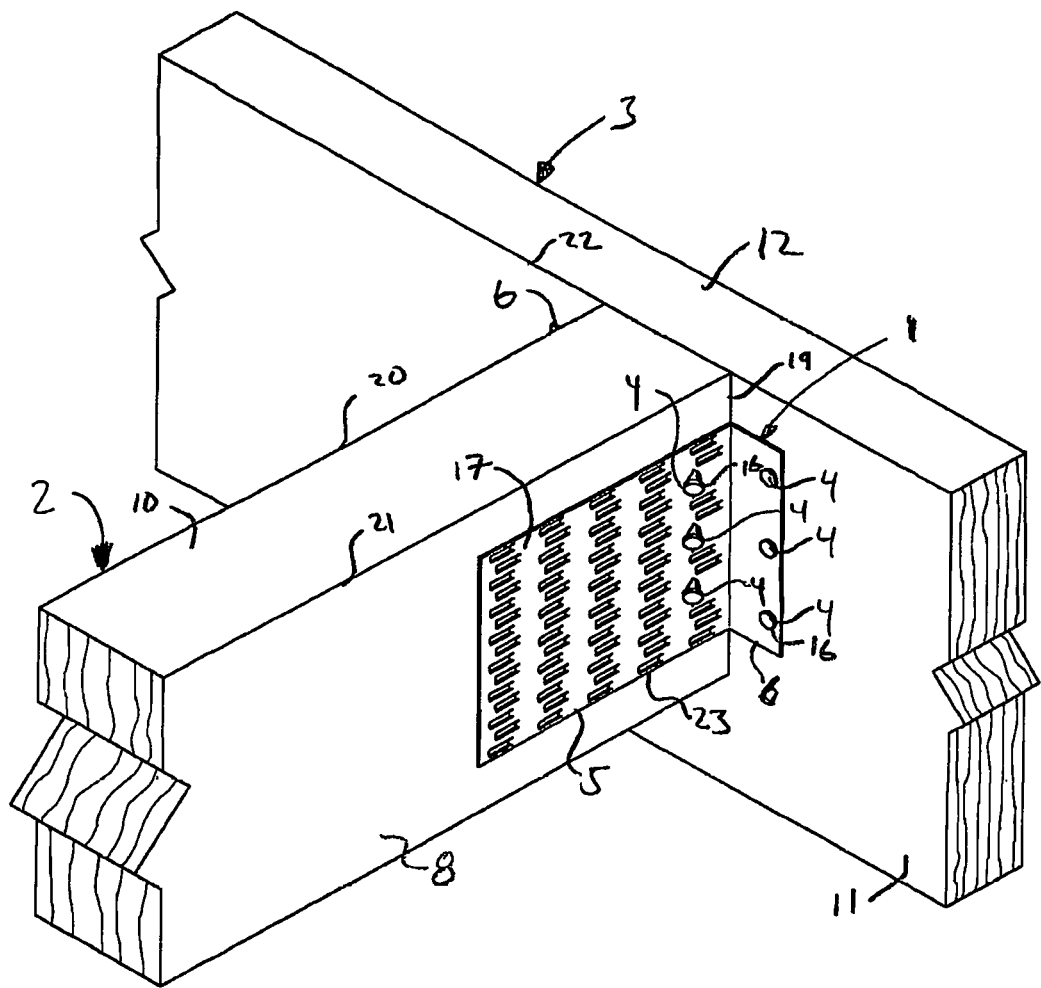
FIG. 1 is a perspective view of a connection made with two connectors of the present invention.

As shown in FIG. 1, a connector 1 makes a connection between a held member 2 and a holding member 3 with fasteners 4. The held member 2 can be a joist or the bottom chord of a nail plate truss, as in a roof of a building. The holding member 3 can be a header or the bottom chord of a second nail plate truss.

The connector 1 is preferably formed with a main body 5 and an end flange 6. The end flange preferably extends the height of the main body 5 and is attached to the main body 5 at a bend between the main body 5 and the end flange 6. As shown in FIG. 1, the main body 5 interfaces with and is connected to the held member 2, and the end flange 6 interfaces with and is connected to the holding member 3. Preferably, the held member 2 is formed with left and right longitudinal faces 7 and 8, an end face 9, and a top face 10. The holding member 3 is preferably formed with an attachment face 11 and a top face 12. Preferably, the main body 5 of the connector 1 attaches to either the left or right longitudinal face 7 or 8 of the held member 2, and the end flange 6 of the connector 1 attaches to the attachment face 11 of the holding member 3. Preferably, the left and right longitudinal faces 7 and 8, the end face 9, the top face 10 of the held member 2, and the attachment face 11 and the top face 12 of the holding member 3 are planar surfaces, as shown in FIG. 1. Preferably, the main body 5 and the end flange 6 of the connector 1 are generally planar members, that are integrally formed and joined at a bend line. The held member 2 and the holding member 3 can both be plated roof trusses. The left and right longitudinal faces 7 and 8 are preferably at right angles to the attachment face 11, but they need not be.

Figure 6:
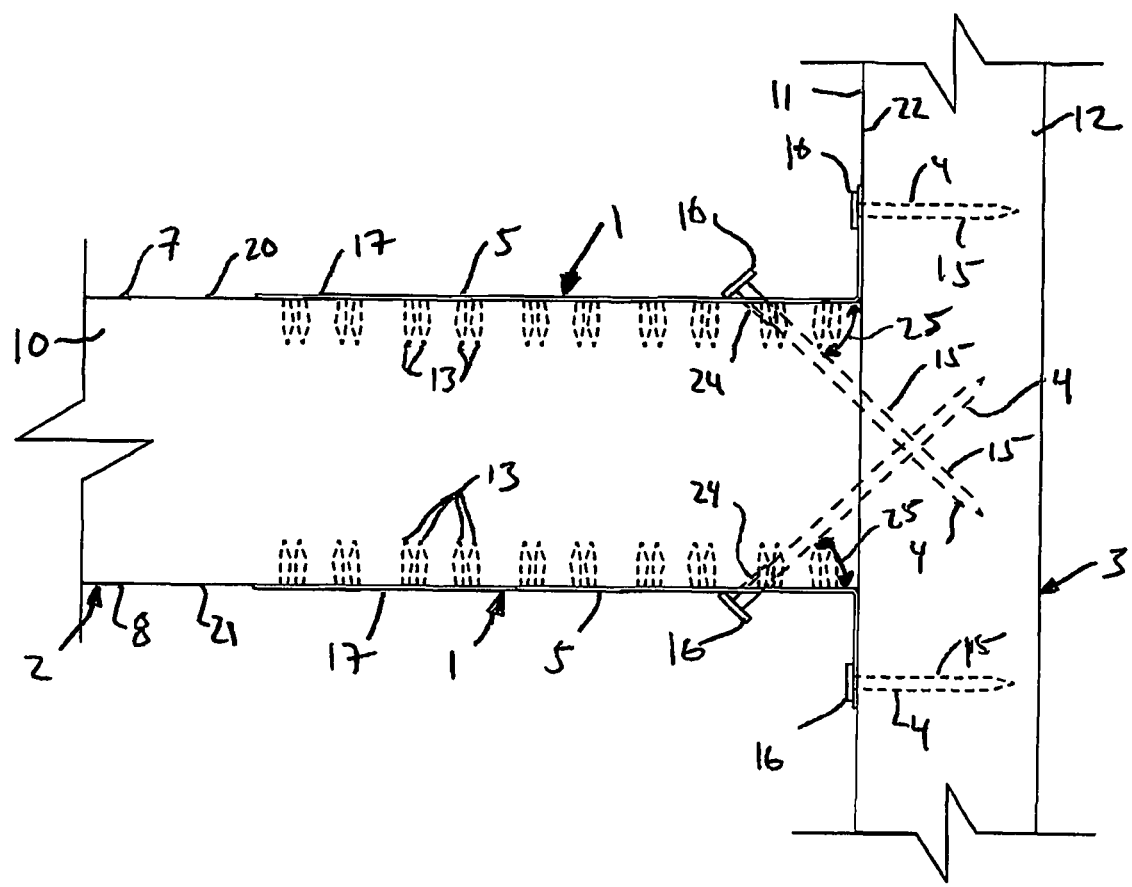
FIG. 6 is a top view of a connection made with two connectors of the present invention.

As is best shown in FIGS. 1 and 6, preferably fasteners 4 are driven through both the main body 5 and the end flange 6 to make the connection. Preferably, the fasteners 4 that are driven through the main body 5, are sufficiently long and are driven at an acute angle to the main body 5 of the connector 1 such that fastener 4 enters held member 2 at longitudinal face 7 or 8 and emerges from the end face 9 and enters the holding member 3 through attachment face 11. This type of attachment where fastener 4 makes a connection between the connector 1 and the held member 2 and a connection between the held member 2 and the holding member 3 is called double-shear nailing and is described in U.S. Pat. Nos. 4,480,941 and 5,603,580, the contents of which are herein incorporated by reference. Preferably, the fasteners 4 that are driven through end flange 6 and into the attachment face are driven orthogonally to end flange 6 and attachment face 11, although such is not required by the invention.

Figure 2:
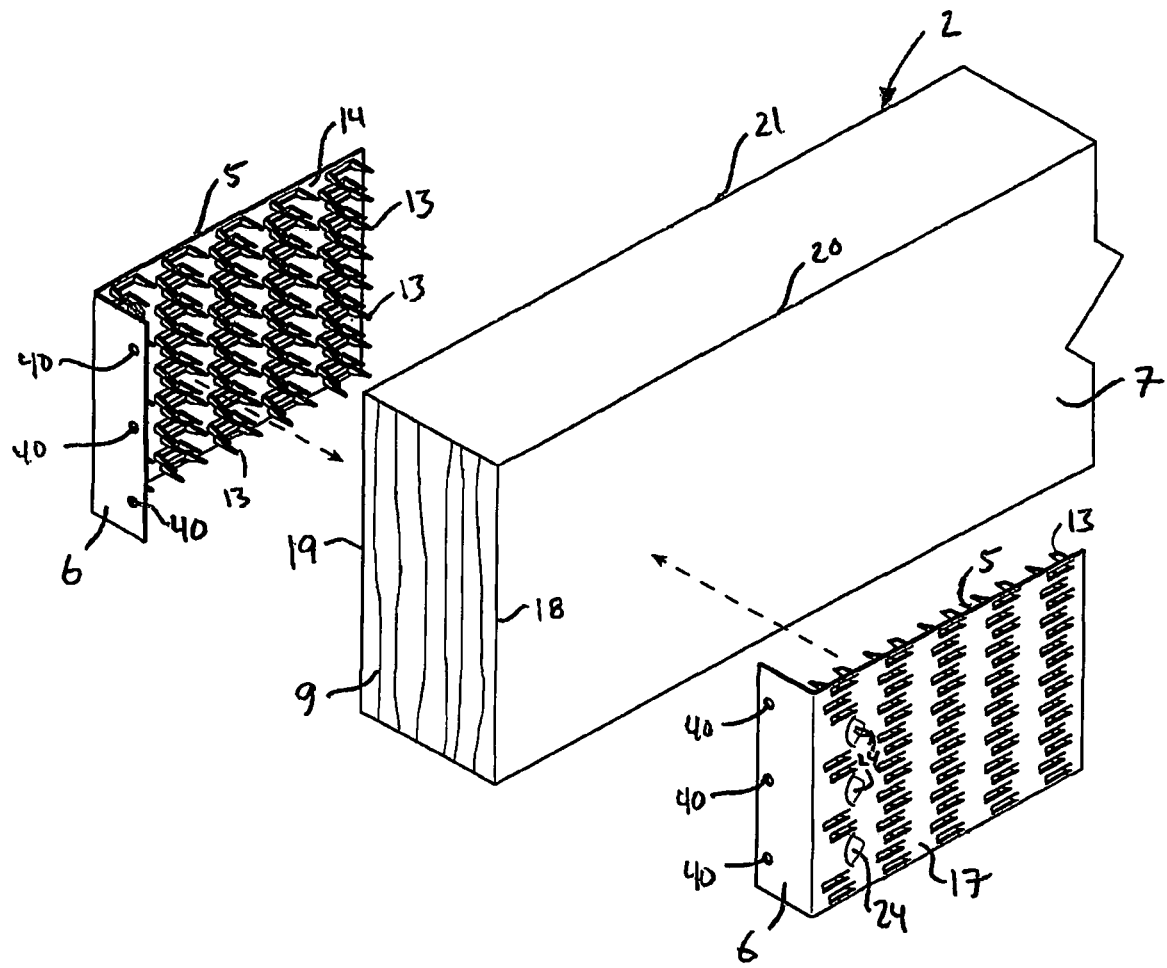
FIG. 2 is a perspective view of two connectors of the present invention shown in relation to the end of a joist to which they are to be attached.

As is also shown in FIG. 6, preferably the connector 1 has nail prongs 13 or integral teeth protruding from the inside face 14 of the main body 5. The nail prongs 13 are driven into the longitudinal face 7 or 8 of the held member 2. As shown in FIG. 2, the nail prongs 13 are substantially spread over the main body 5 of the connector. As is best shown in FIG. 6, fasteners 4 that are driven through the main body 5 are formed with an elongated, straight shank 15 that is embedded in both the held member 2 and the holding member 3. Fasteners 4 that are driven through the main body 5 are also formed with a head 16 that preferably engages the outside face 17 of the main body 5.

As shown in FIG. 2, the end face 9 of the held member 2 has left and right longitudinal edges 18 and 19 where the end face 9 meets the left and right longitudinal faces 7 and 8 of the held member 2, and the top face 10 of the held member 2 has left and right longitudinal edges 20 and 21 where the top face 10 meets the left and right longitudinal faces 7 and 8 of the held member 2. As shown in FIG. 1, the top face 12 of the holding member 3 has a front edge 22 where the top face of the holding member 3 meets the attachment face 11 of the holding member 3.

As shown in FIG. 2, preferably, the nail prongs 13 are formed such that there are two nail prongs 13 for each opening 23 formed in the main body 5 to create the nail prongs 13. The connector 1 can be manufactured from ASTM A653/A653M, A591, A792/A792M, or A167 structural quality steel that is protected with zinc or zinc-aluminum alloy coatings or their stainless steel equivalent.

As is best shown in FIGS. 5, 9, 10 and 11, a nail guide 24 is provided for positioning the fastener 4 with respect to the main body 5 of the connector 1 and the held member 2 only at a preselected angle 25 which is substantially less than 90°. The nail guide 24 is formed to project inwardly from the inside face 14 of the main body. That is to say, when the main body 5 is attached to the held member 2 with the inside face 14 of the main body 5 registering with the longitudinal face 7 of 8 of the held member 2, the nail guide 24 is pressed into or embedded in the held member 2.

Figure 7:
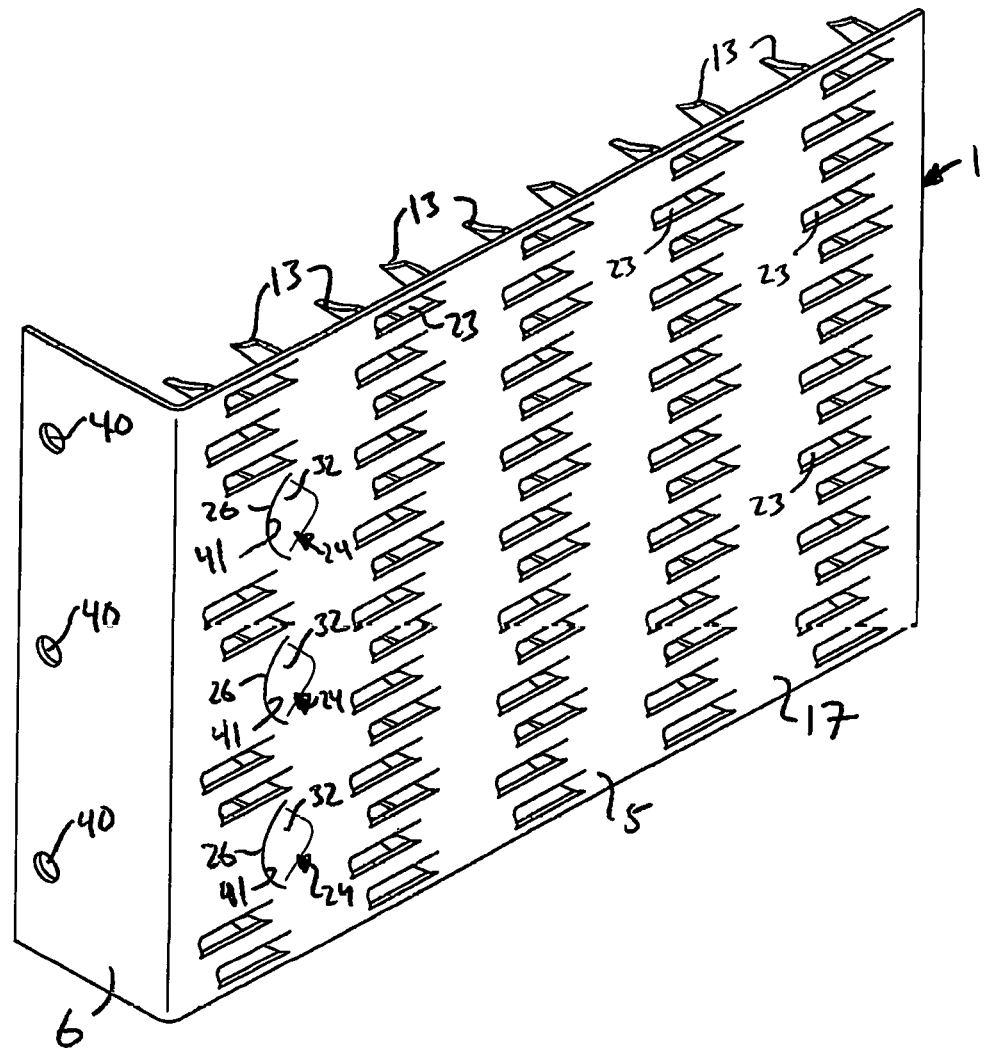
FIG. 7 is a back perspective view of a connector of the preset invention.
Figure 8:
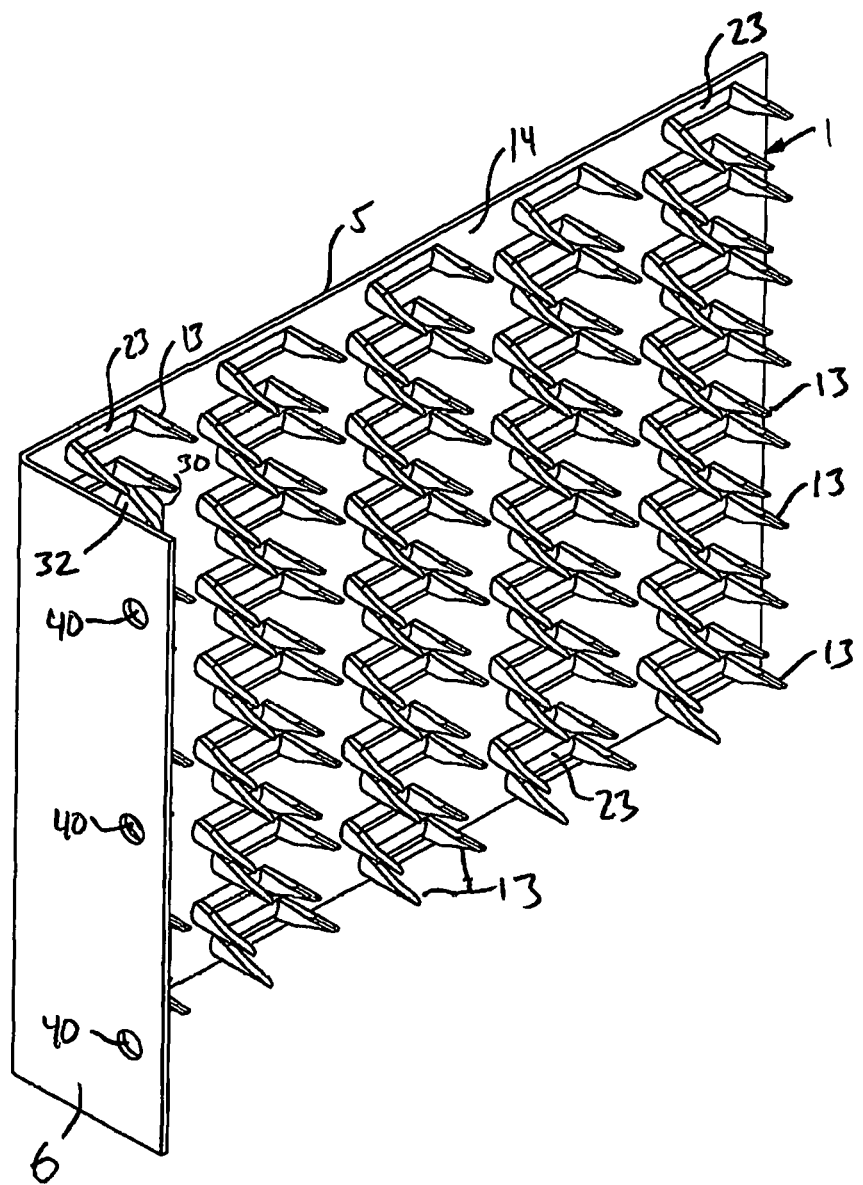
FIG. 8 is a front perspective view of a connector of the present invention.
Figure 20:
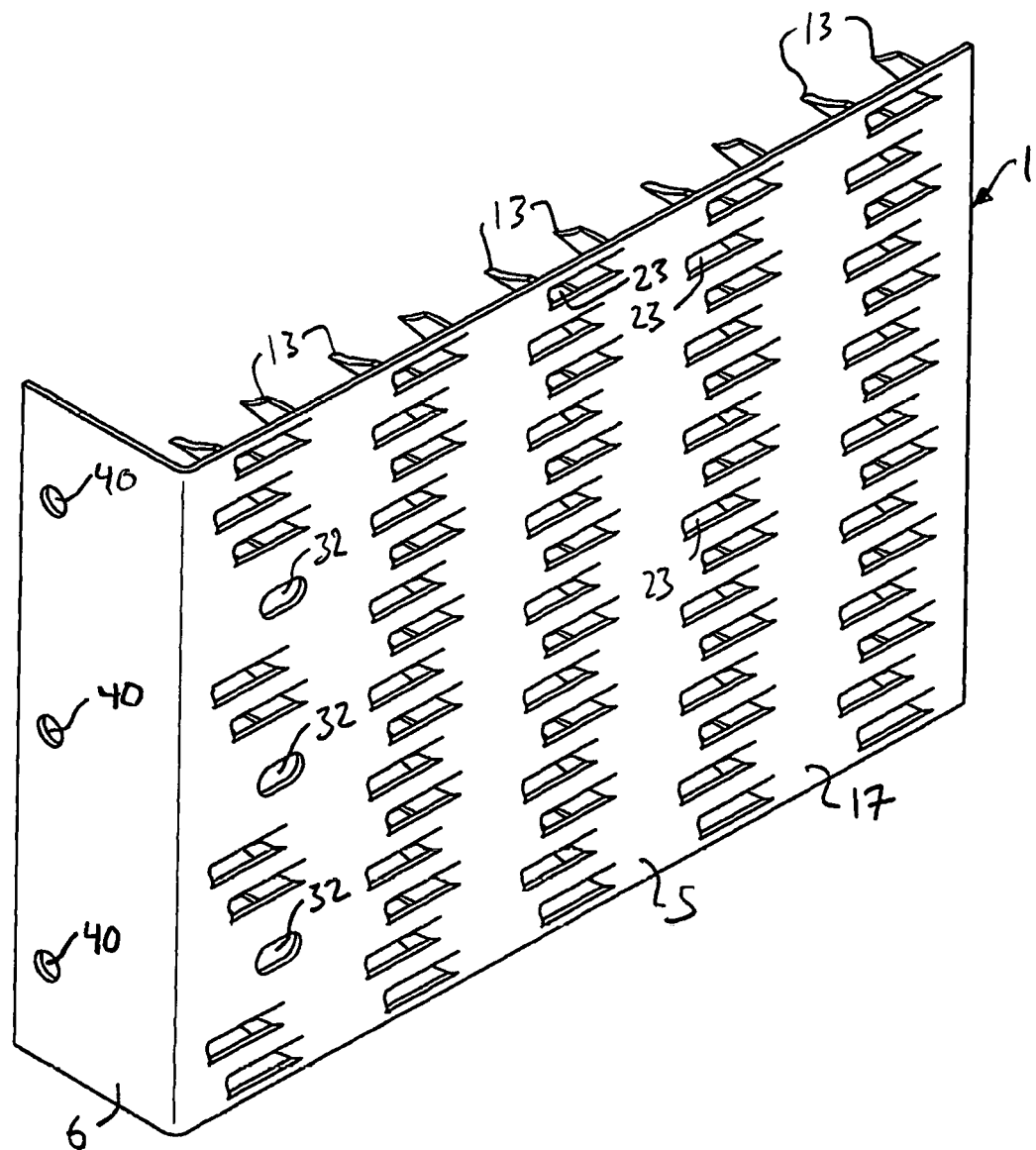
FIG. 20 is a perspective view of an alternate connector of the present invention.

In the preferred embodiment, the connector 1 is formed with a main body 5 having a generally planar inside face portion 14 for close registration with a generally planar longitudinal face 7 or 8 of the held member 2. The nail guide 24 includes an arcuate slit-cut 26 (see FIGS. 7 and 9) in the main body 5 and a guideway 27 formed from the deformed material of the main body 5, creating a half-cone 28. The guideway 27 in the form of a half-cone 28 has a curved outer wall 29, an apical top 30 where it converges with the main body 5 and a base 31 where it is mostly separated from the main body 5. The curved wall 29 of the guideway 27 lies at an angle to the main body 5. The arcuate slit-cut 26 and guideway 27 form a fastener opening 32 for the receipt of the fastener 4. The shank 15 of the fastener 4 generally has a constant cross section. In the preferred embodiment, the guideway 27 is formed with an inner wall 33 having a length and strength sufficient to unyieldingly hold the shank 15 of the fastener 4 in combination with the edge 41 of the acruate slit-cut 26 at the preselected angle 24 during the driving of the fastener 4 into the held member 2. As shown in FIG. 20, the fastener opening 32 can be an elongated, obround opening with no guide way.

Figure 9:
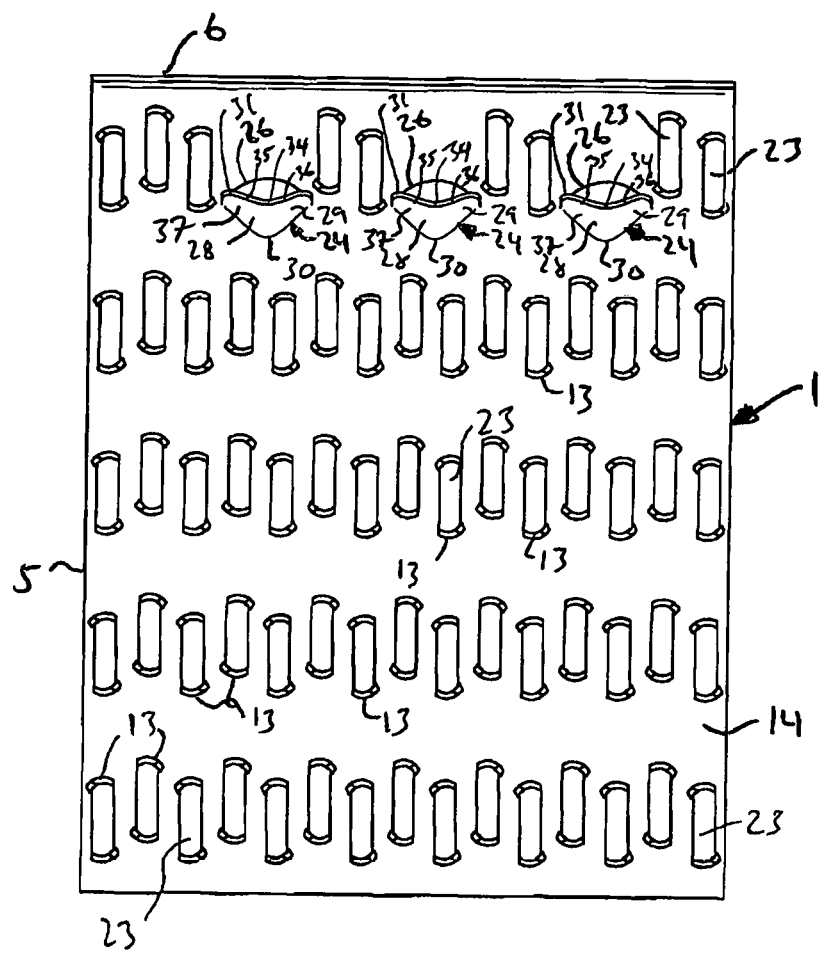
FIG. 9 is front view of a connector of the present invention.
Figure 10:
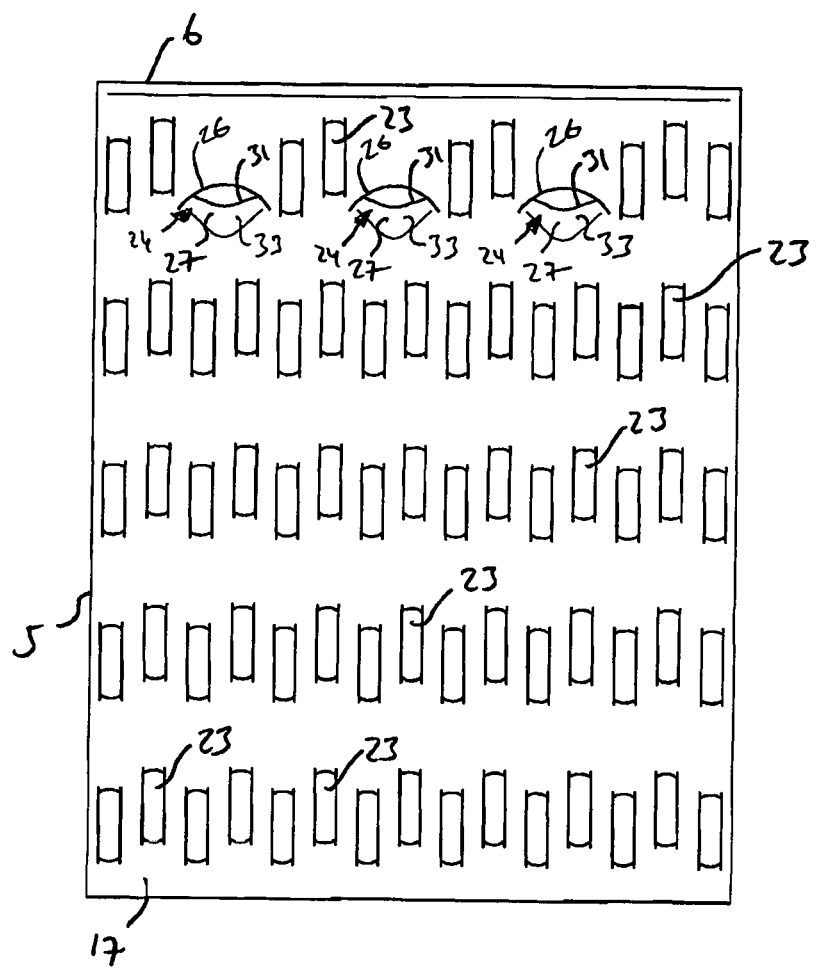
FIG. 10 is a back view of a connector of the present invention.
Figure 11:
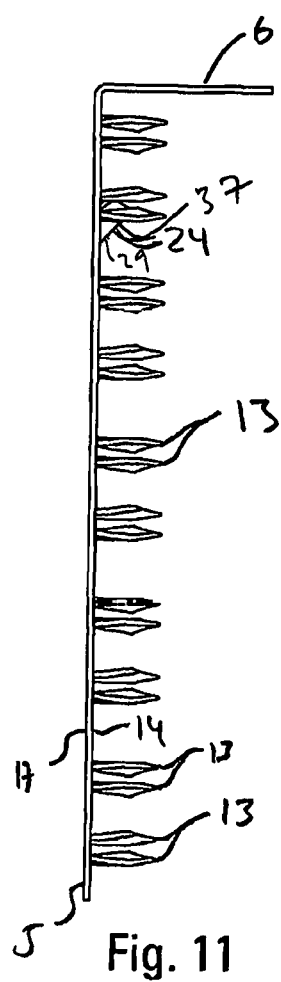
Figure 12:
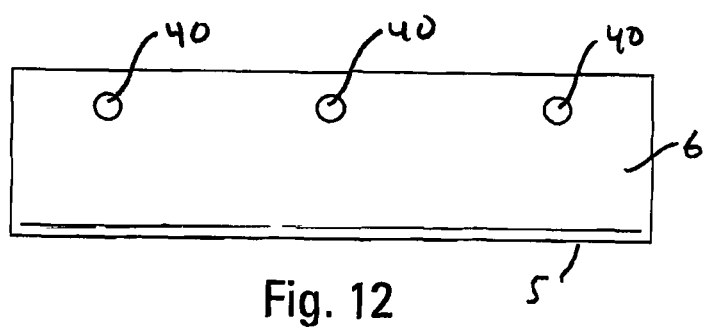
FIG. 12 is a right end view of the connector of the present invention.
Figure 13:
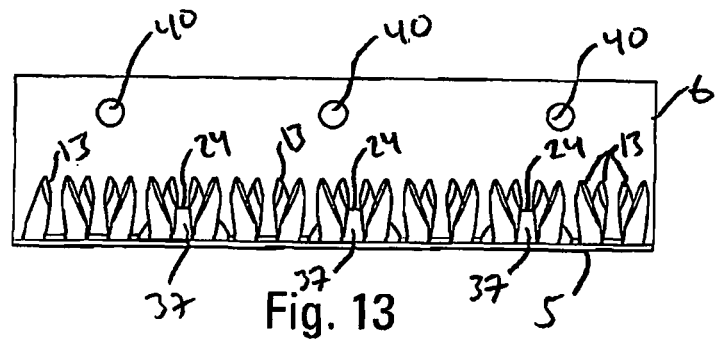
FIG. 13 is a left end view of the connector of the present invention.
Figure 14:
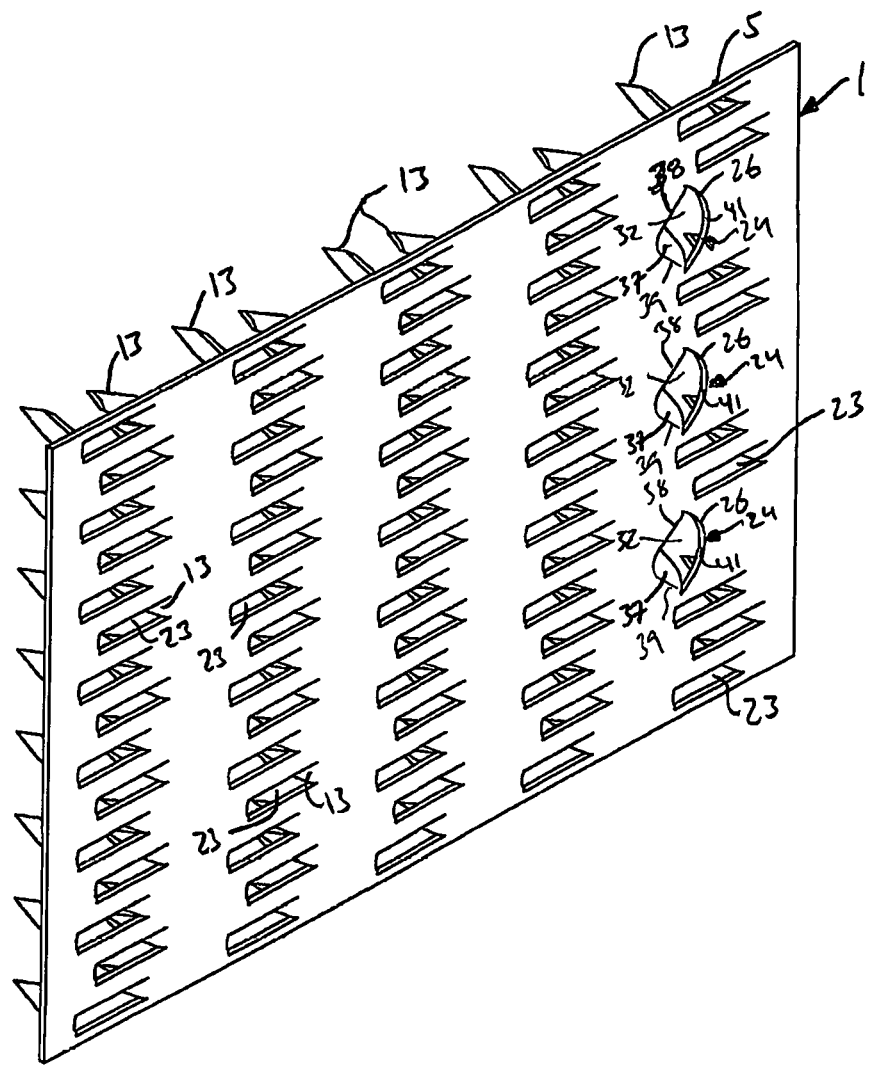
FIG. 14 is a back perspective view of an alternate connector of the present invention.
Figure 15:
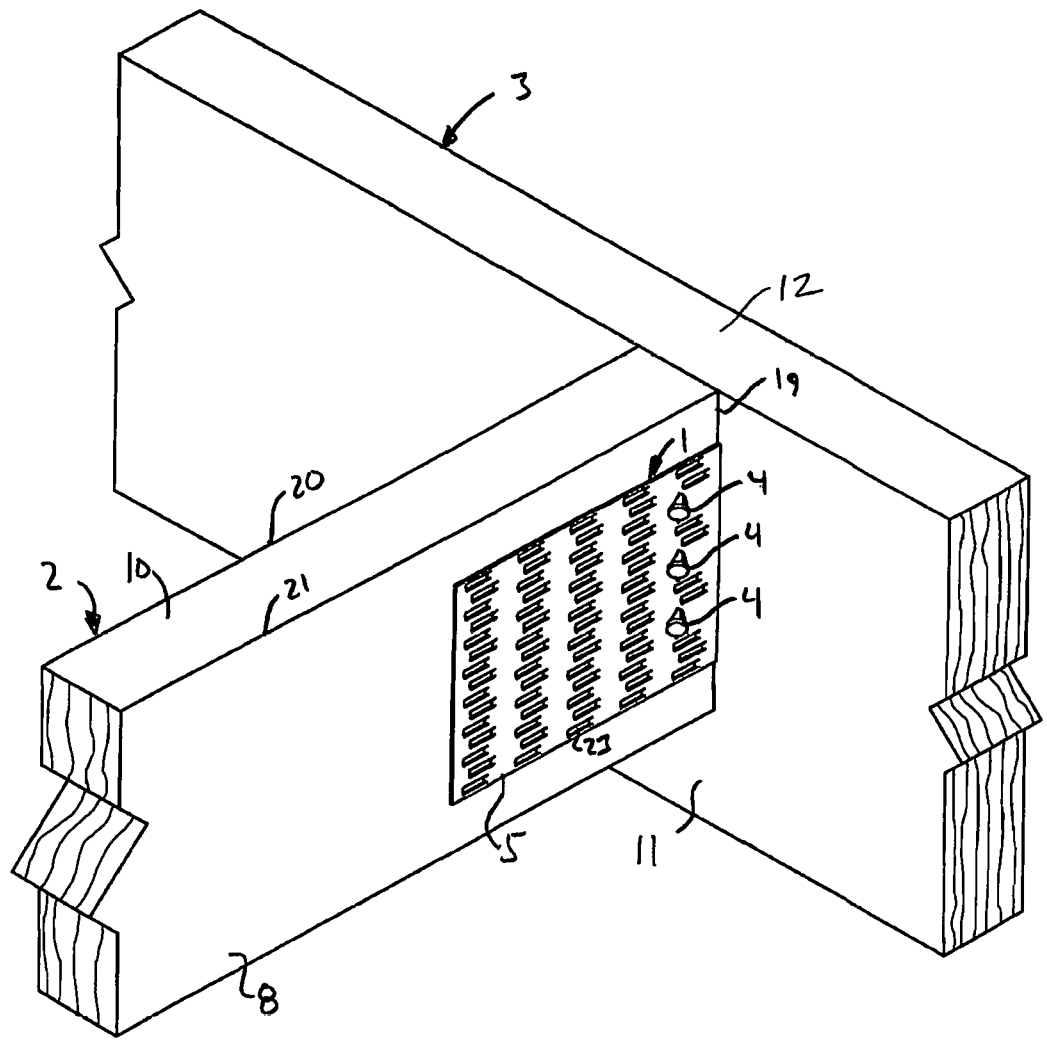
FIG. 15 is a perspective view of an alternate connection of the present invention.
Figure 16:
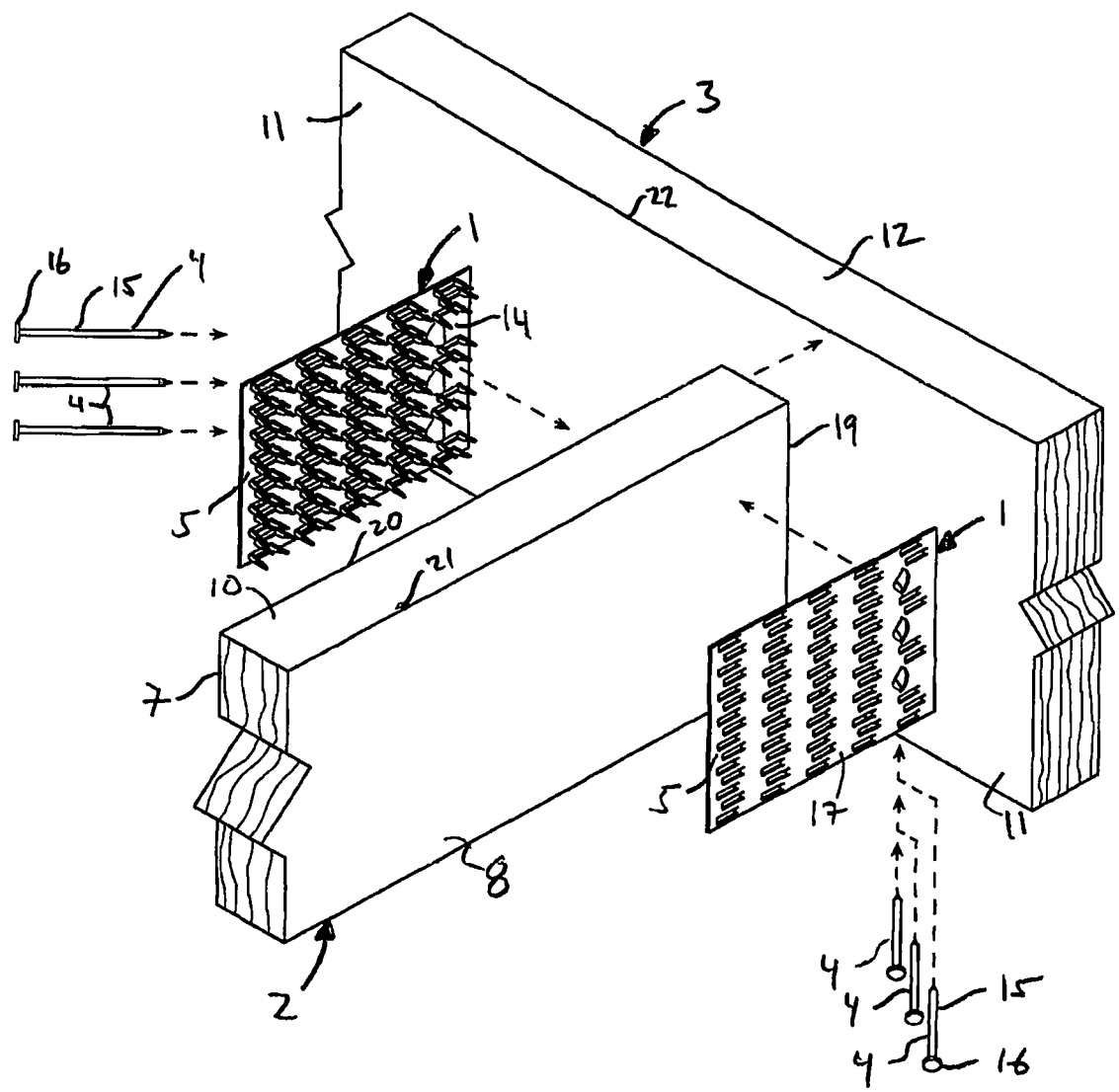
FIG. 16 is an exploded view of the alternate connection of the present invention shown in FIG. 15.
Figure 17:
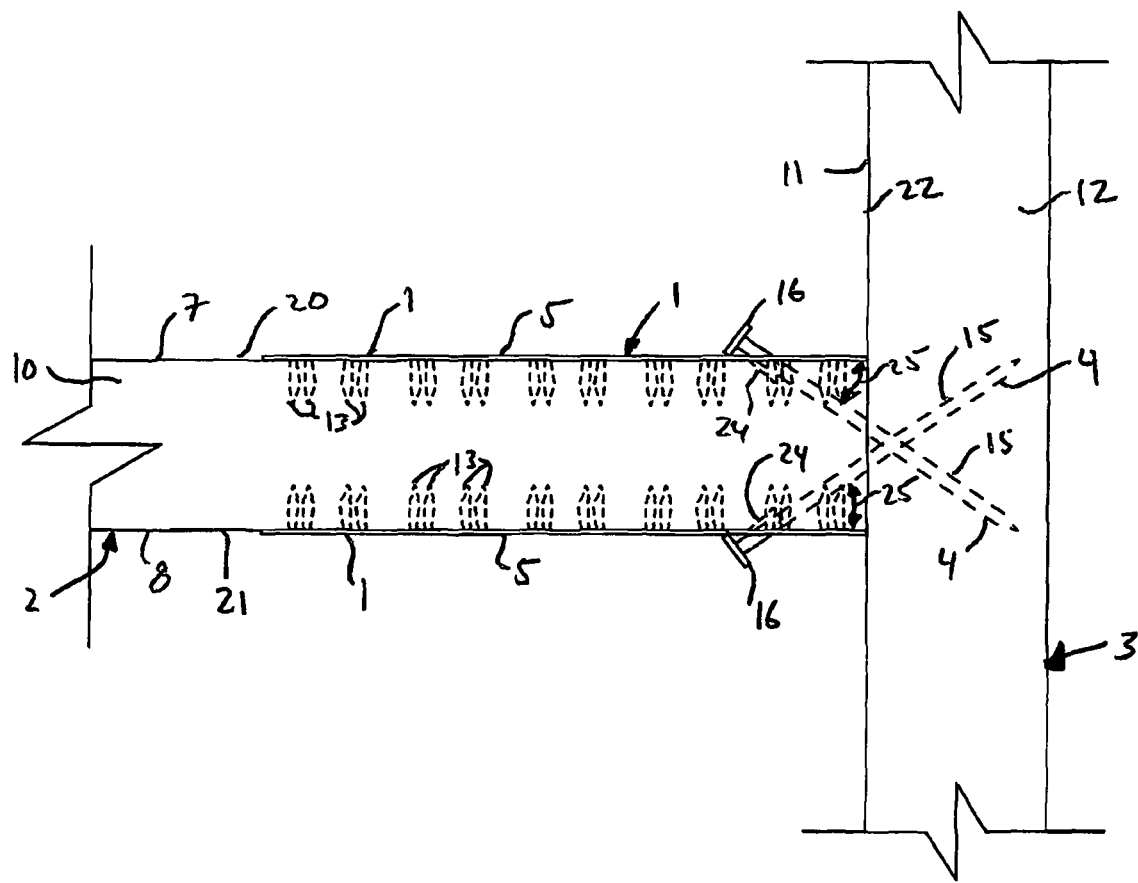
FIG. 17 is a top view of the alternate connection of the present invention shown in FIG. 15.
Figure 18:
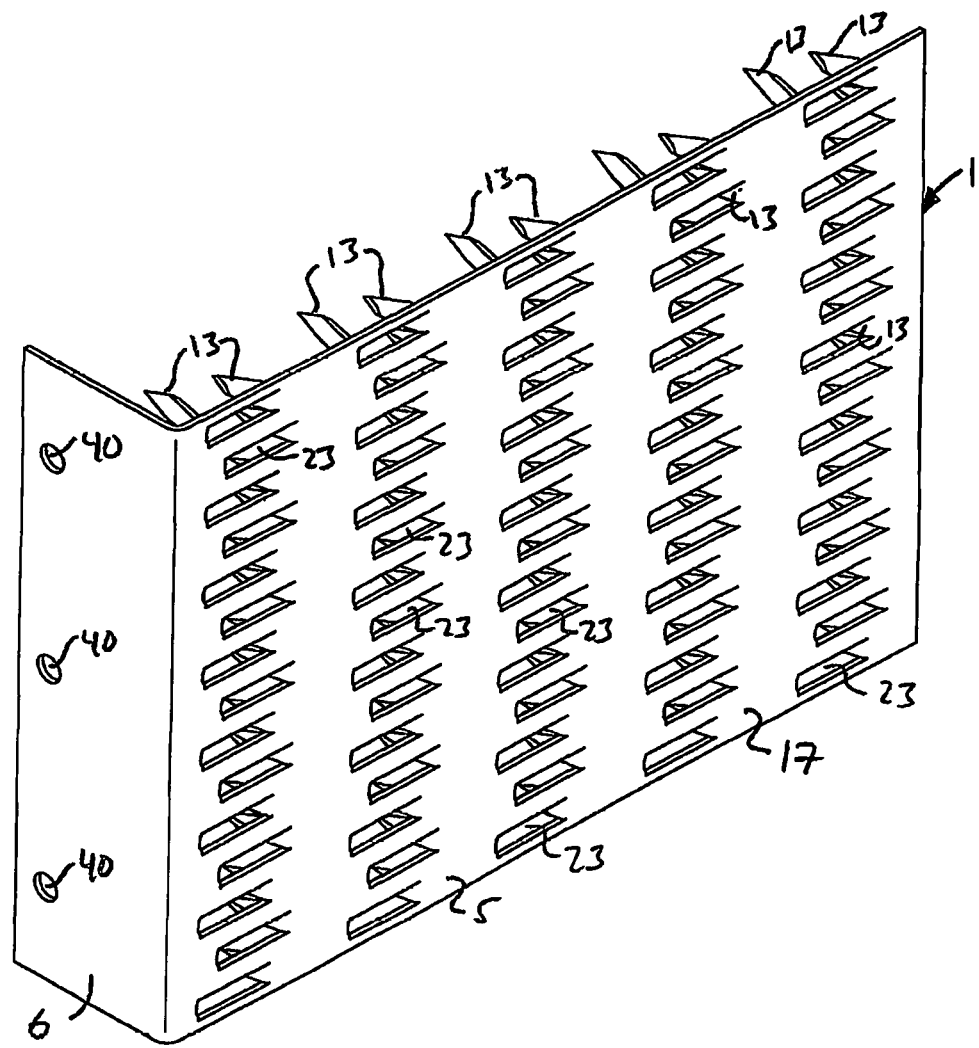
FIG. 18 is a perspective view of an alternate connector of the present invention.
Figure 19:
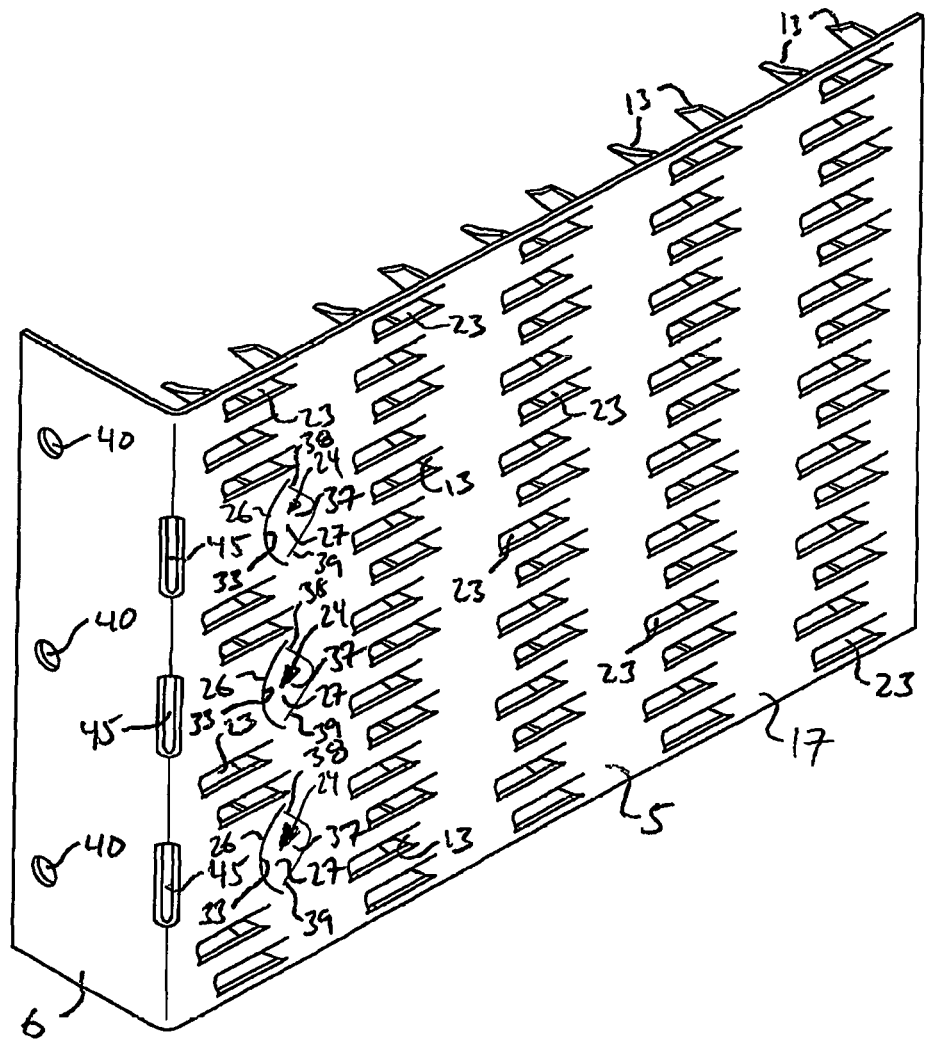
FIG. 19 is a perspective view of an alternate connector of the present invention.

In the preferred embodiment, the nail guide 24, as best shown in FIGS. 9 and 10, is preferably constructed with the fastener opening 32 having the general shape of an oval or circle having an arcuate apex 34, two generally arcuate sides 35 and 36 and a generally arcuate base which is also the arcuate edge 33 of slit cut 26; and the fastener opening 32 is dimensioned to receive the fastener 4 and is dimensioned generally equal to or slightly less than the diameter of the fastener shank 15.

This oval shape for the opening 32 for receiving the fastener 4 is preferred, because it creates a smaller opening 32 for receipt of the fastener 2 and it provides a geometry that puts less stress on the half-cone 28 during formation, so that a more perfect half-cone 28 can be formed, one which is much less likely to have stress cracks over more triangular-shaped prior art openings.

In using the nail guide 24, when the fastener 4 is inserted through the fastener opening 32, see FIG. 6, the shank 15 of the fastener 5 is engaged by the guideway 27 by at least at two longitudinally spaced points on the guideway and at least at one point on the edge 33 of the arcuate slit-cut 26 at a location radially spaced from the two longitudinally spaced points on guideway inner wall 32 and at a location longitudinally between the two longitudinally spaced points on guideway inner wall 32. This geometry insures that the fastener 4 is firmly held and positively guided at three points during the entire fastener driving procedure.

The guideway 27 in each of the nail guides 24 are preset at a selected angle when the connector is made so that fasteners 4 will be driven through the held member 2 and into the holding member 3 at an angle less than 90 degrees. By locating the fastener opening 32 at particular point along the held member 2, particular fasteners 4 designed to work with the connector 1 can be driven sufficiently into the held member 2 and the holding member 3 without intersecting with the other fasteners 4 or contributing to the splitting of the held member 2. The installer need only start the fastener 4 at an acute angle and the guideway 27 accurately places the fastener 4 at the correct angle which is set at the factory. Thus an unskilled installer can accurately and properly install the connector 4 without splitting the held member 2.

It has been found that a single die member is capable of cutting the arcuate slit-cut 26 in main body 5 and forming the guideway 27 in the form of a half-cone 28. It is to be understood that half-cone 28 is not a perfect cone, but the word cone is use since it is the nearest geometric figure which describes the shape of the deformation in the main body 5. The arcuate slit-cut 26 and the half cone 28 are both done quickly at a single station thus contributing to the cost reduction in forming the position fastener-angling device or nail guide as compared to the slot and tab member illustrated in U.S. Pat. No. 4,480,941.

In the preferred embodiment of the present invention, the punch used to make the arcuate slit cut 26 and form the half-cone 28 is a cylindrical dowel whose leading section has been provided with shaved edges to slit and then push the metal up. Wherever, the die pushes all the way through the thickness of the metal, the punch provides a circular edge, thus the die can be used with a circular button to receive the punch. This is beneficial, because as the button is used through multiple operations of the die, the button can be rotated to provide a cleaner edge for the shearing of the arcuate slit cut 26.

Figure 23:
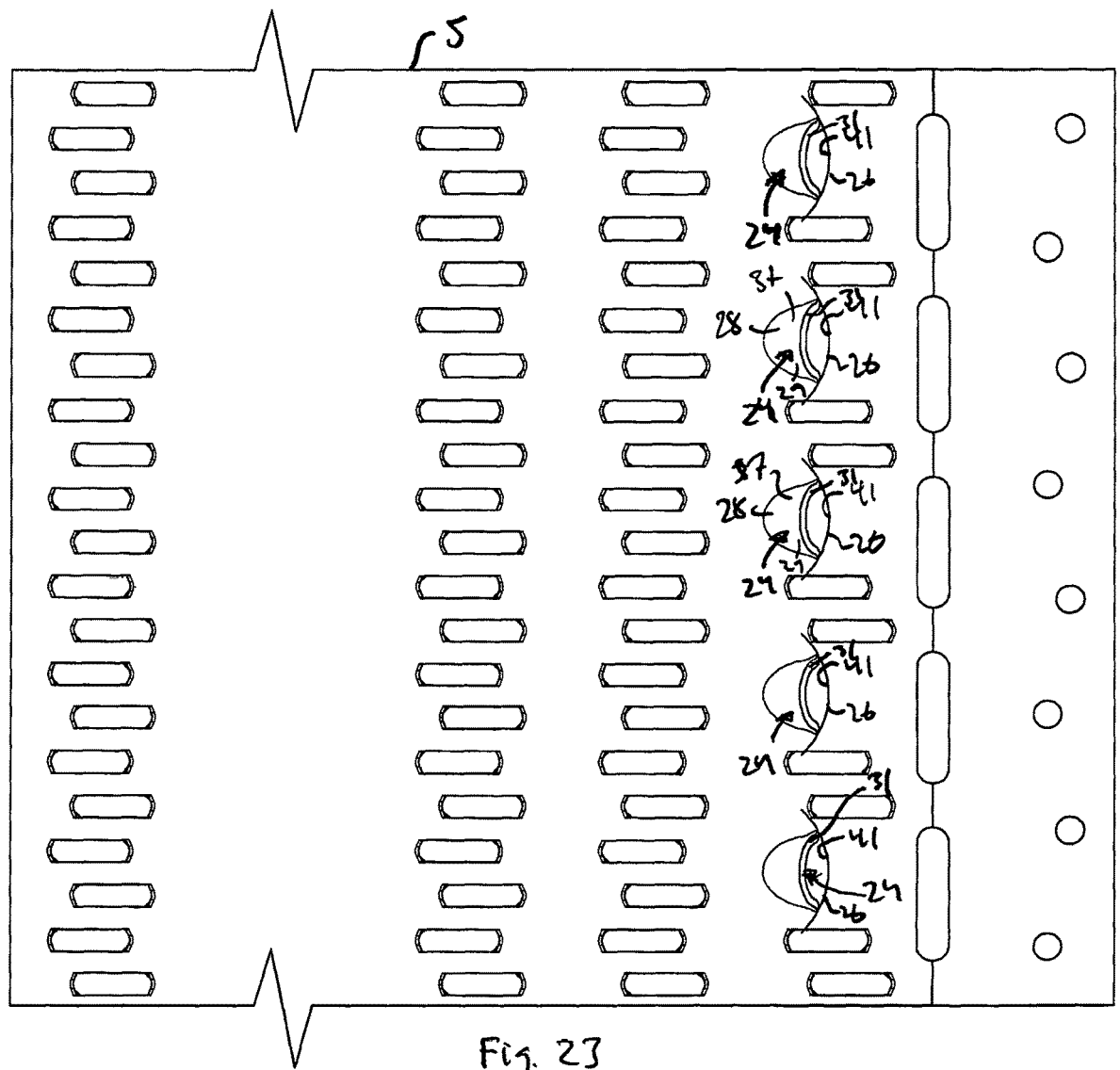
FIG. 23 is front view of a connector of the present invention.
Figure 24:
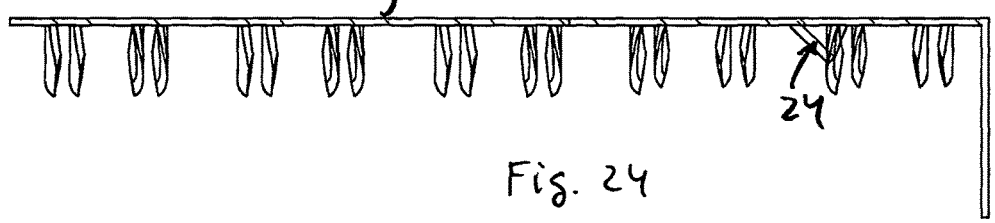

As shown in FIG. 2, the nail guide 24 preferably projects inwardly toward the held member 2, and is formed from the material of the main body 5. The nail guide 24 is formed with a raised embossed portion 37 or arched portion, the raised embossed portion having first and second bracketing transition areas 38 and 39 where at least portion of the embossed portion 37 is joined to the main body 5. The raised embossed portion 37 that makes up the nail guide 24 can be said to start at one bracketing transition area 38 where it rises out of the main body 5 an ends at the other bracketing transition area 39 where returns to the main body 5. As shown in FIGS. 23 and 24, the raised embossed portion 37 can be formed with a rounded, arched shape to aid in embedding the raised embossed portion 37 in the held member 2.

Figure 3:
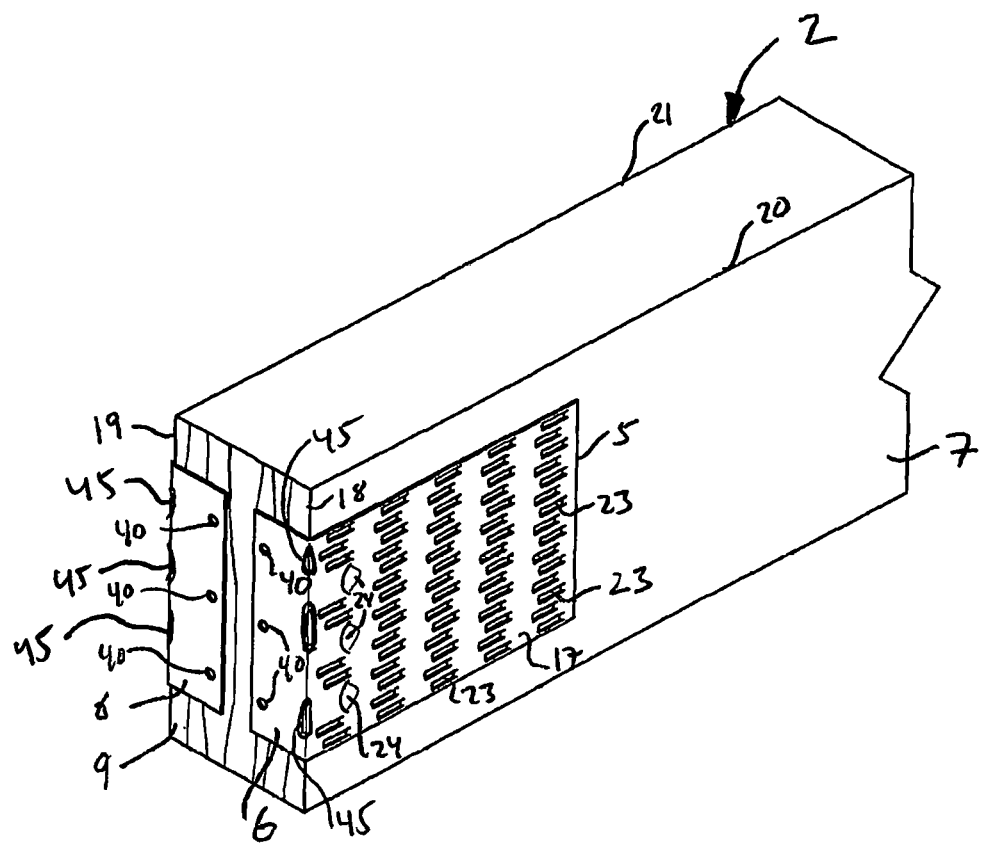
FIG. 3 is a perspective view of two connectors of the present invention attached to the end of a joist.
Figure 4:
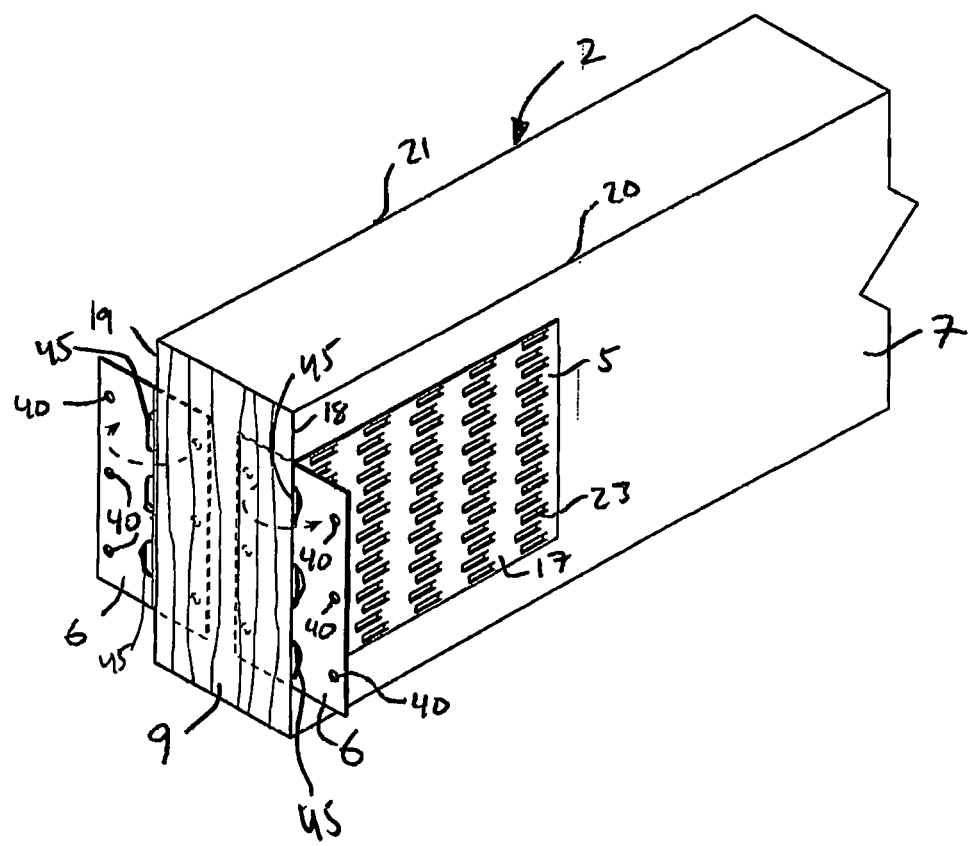
FIG. 4 is a perspective view of two connectors of the present invention attached to the end of a joist with the end flanges of the connectors bent outwardly.
Figure 5:
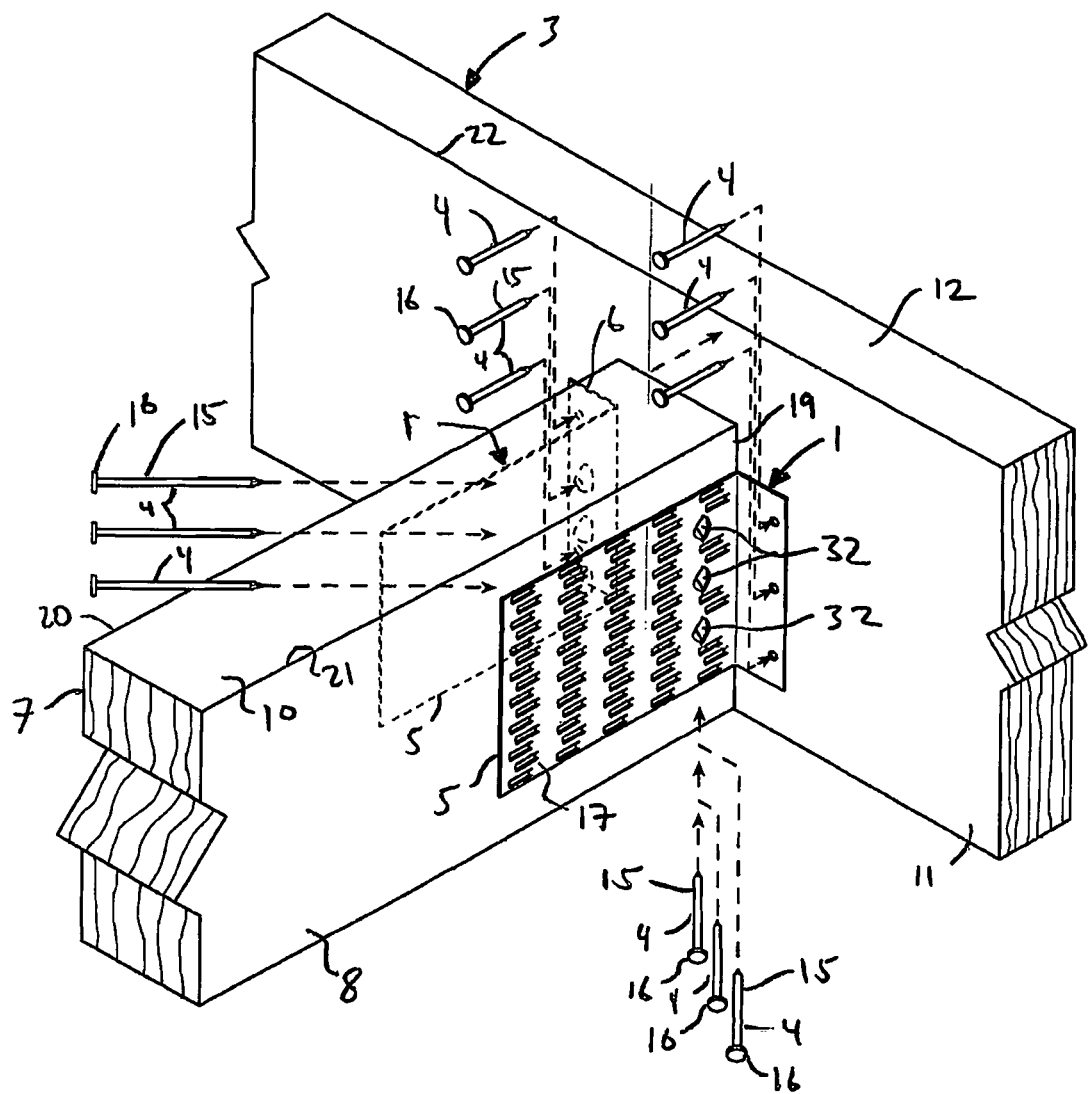
FIG. 5 is a perspective view of connection made with two connectors of the present invention.
Figure 21:
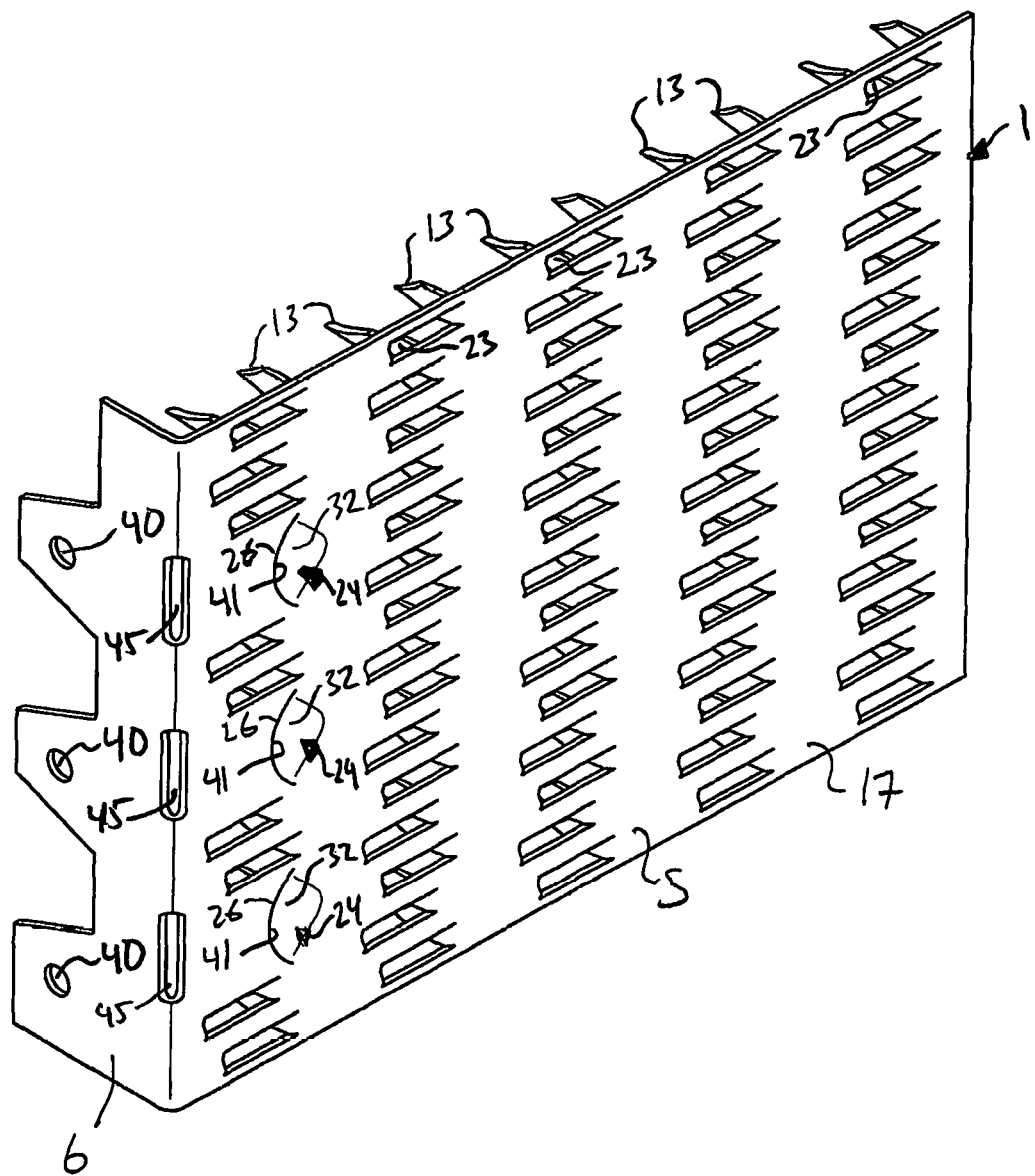
FIG. 21 is a perspective view of an alternate connector of the present invention.
Figure 22:
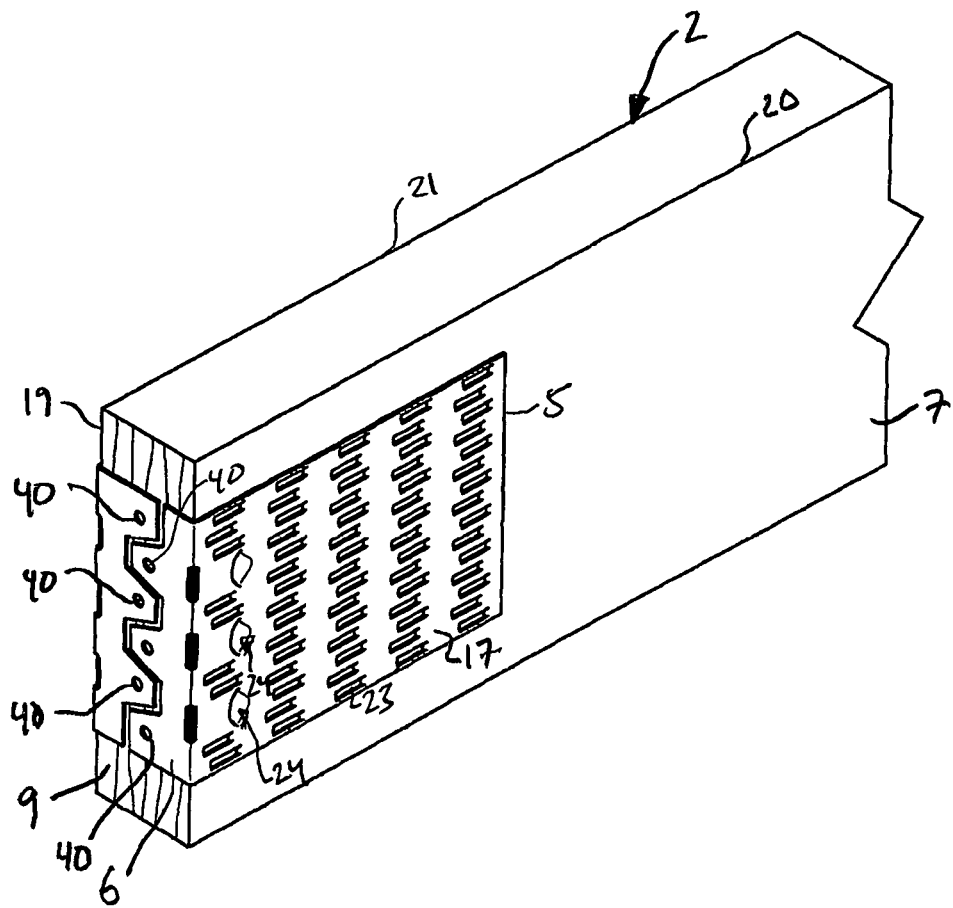
FIG. 22 is a perspective view of an alternate connection of the present invention.

As shown in FIGS. 2 and 3, the end flange 6 of the connector 1 is preferably initially formed so that it extends orthogonally from the main body in the same direction as the nail prongs 13, if present. The end flange extends orthogonally from the inside face 14 of the main body 5, where the inside face 14 is attached to a longitudinal face, such as side face 7 or 8 or top face 12, of the held member 2. In this manner the end flange 6 wraps around the end face 9 of the held member 2 when the main body 5 is connected to the held member 2. Preferably, the end flange 6 registers with the end face of the held member 2, or is closely adjacent thereto. By forming and positioning the end flange in this manner 6, the end flange can be used as an indexing member to properly locate the connector 1 with respect to the end face 9 of the held member 2, so that fastener openings 32 for the nail guide 27 are properly located. If the connector 1 is attached to the held member before transport of the held member 2 to the building location, this also allows for some degree of protection of the end flange 6 during transport at it is not extending away from the held member 2, but is closely adjacent thereto. As show in FIGS. 21 and 22, the end flange 6 can be formed with extending tabs 50 that create alternating notches 51 in the end flange 6. Paired connectors 1 can be made where the extending tabs 50 alternate between the connectors such that extending tabs 50 of one connector extend into the notches 51 of the other connector. This allows the effective width of the end flanges 6 to be wider when two connectors 1 are used on a thin held member 2.

Preferably, the connector 1 can be made with weakening openings 45 between the end flange 6 and main body 5 so that the end flange 6 can be bent 180 degrees when it is ready to be installed, such that the end flange 6 extends from and is substantially aligned with the end face 9 of the held member 2. The installer then drives fasteners 4 through fastener openings 40 in the end flange 6 and into the holding member 3.

The connector 1 is preferably made from sheet steel on a progressive die machine which cuts and forms the opening 23, 32, 40, and 45 and forms the nail prongs, if present, and bends the connector to form the end flange 6 and the main body 5.

The connection is created by first attaching the main body 5 of the connector 1 to the held member 2. Preferably, the held member 2 has an end face 9 and one or more longitudinal faces 7 and 8 meeting the end face 9 at one or more longitudinal edges 18 and 19 of the end face 9. The connector 1 is attached to one of the longitudinal faces 7 or 8. The connector 1 has a main body 5 that interfaces with the longitudinal face 7 or 8 of the held member 2. The main body 5 preferably has a nail guide 24. The nail guide 24 has a guide way 27 protruding from the main body 5 of the connector 1 and a fastener opening 32 associated with the guide way 27. The protruding guide way 27 of the nail guide 24 is pressed into the longitudinal face 7 or 8 of the held member 2 when the main body 5 of the connector 1 is attached to the held member 2, such that the guide way 27 of the nail guide is embedded in the held member. If no end flange 6 is present, the end face 9 of the held member 2 is then place in abutting relation with an attachment face 11 of a holding member 3, and a fastener 4 is driven through the nail guide 24 of the main body 5, the fastener 4 having a shank 15, such that the shank 15 of the fastener 4 first passes through the fastener opening 32 of the nail guide 24 and then through the held member 2 such that a portion of the shank 15 of the fastener 4 is embedded in the holding member 3.

If an end flange 6 is present, when the held member 2 is ready to be attached to the holding member 3, the end flange 6 can be bent 180 degrees to flare outwardly from the held member 2. The held member 2 is then aligned with the holding member 3, and attached by fasteners 4.

We claim:

1. A connection comprising:
   a held member having an end face and opposing parallel longitudinal faces meeting said end face at opposing longitudinal edges of said end face;
   a holding member having an attachment face with the end face of the held member in abutting relation to the attachment face of the holding member in an assembled position;
   a pair of connectors, each connector comprising:
   a planar main body attached to a respective one of the opposing longitudinal faces of the held member, the main body having an inside face and an outside face, the main body having integral nail prong fasteners extending from the inside face of the main body that are embedded in the held member in a pre-assembled position such that the connector is attached to the held member, the integral nail prong fasteners being substantially spread over the main body of the connector, the integral nail prong fasteners being rigid members that extend away from the main body toward the held member and are bent orthogonally from the main body at the sides of openings in the main body; and
   a planar end flange connected to the main body adjacent a respective one of the opposing longitudinal edges of said end face of the held member, with weakening openings disposed between the end flange and the main body, a distal edge of the end flange being formed with spaced-apart extending tabs that create notched areas between the tabs;
   wherein in a first pre-assembled position, each of the end flanges is bent inwardly to a position which is closely adjacent to and parallel with said end face of said held member such that said end flange overlies and covers a portion of the end face of the held member, and such that the tabs of one said end flange are matingly received within the notched areas of the other said end flange;
   wherein in a second assembled position, each of the end flanges are bent outwardly to a position where each of the end flanges interfaces with the attachment face of the holding member, and each of the end flanges is connected to the holding member by one or more fasteners driven through the end flange and into the holding member; and
   one of the pair of connectors in the assembled position receives a fastener passing through the main body of said one of the pair of connectors and the held member, such that a portion of a shank of the fastener is embedded in the holding member and the other of the pair of connectors in the assembled position receives a different fastener passing through the main body of the other of the pair of connectors and the held member, such that a portion of a shank of the different fastener is embedded in the holding member.

2. The connection of claim 1, wherein the main body of each connector also has a nail guide, the nail guide having a guide way protruding from the main body of the connector and a fastener opening associated with the guide way, and the shank of the fastener passes through the fastener opening of the nail guide such that a portion of the shank of the fastener is in contact with the guide way, the guide way positioning the shank of the fastener at an acute angle to the main body of the connector.

3. The connection of claim 2, wherein:
   the inside face of each connector is in close registration with one of the longitudinal faces of the held member and the outside face of the main body is unobstructed; and
   the nail guide projects inwardly and the guide way is formed with a raised embossed portion, the raised embossed portion having first and second bracketing transition areas where at least a portion of the embossed portion is joined to said main body, the raised embossed portion being embedded in the held member.

4. The connection of claim 1, wherein the main body of each connector is provided with a fastener opening and the shank of the fastener passes through the fastener opening, and the fastener opening is obround.

5. The connection of claim 4, wherein:
   at least a portion of the fastener opening is reinforced.

6. A connection comprising:
   a held member having an end face and opposing planar longitudinal faces meeting said end face at opposing longitudinal edges of said end face;
   a holding member having an attachment face with the end face of the held member in abutting relation to the attachment face of the holding member in an assembled position;
   a pair of connectors, each connector comprising:
   a planar main body attached to a respective one of the opposing longitudinal faces of the held member, the main body having an inside face and an outside face, the main body having integral nail prong fasteners extending from the inside face of the main body that are embedded in the held member in a pre-assembled position such that the connector is attached to the held member, the integral nail prong fasteners being substantially spread over the main body of the connector, the integral nail prong fasteners being rigid members that extend away from the main body toward the held member and are bent orthogonally from the main body at the sides of openings in the main body, the main body also having a nail guide having a guide way protruding from the main body of the connector and a fastener opening associated with the guide way; and
   a planar end flange connected to the main body adjacent a respective one of the opposing longitudinal edges of said end face of the held member, with weakening openings disposed between the end flange and the main body, a distal edge of the end flange being formed with spaced-apart extending tabs that create notched areas between the tabs;

wherein in a first pre-assembled position, each of the end flanges is bent inwardly to a position which is closely adjacent to and parallel with said end face of said held member such that said end flange overlies and covers a portion of the end face of the held member, and such that the tabs of one said end flange are matingly received within the notched areas of the other said end flange;

wherein in a second assembled positon, each of the end flanges are bent outwardly to a position where each of the end flanges interfaces with the attachment face of the holding member, and each of the end flanges is connected to the holding member by one or more fasteners driven through the end flange and into the holding member; and one of the pair of connectors in the assembled position receives a fastener passing through the fastener opening of the nail guide of said one of the pair of connectors such that a portion of a shank of the fastener is in contact with the guide way, the guide way positioning the shank of the fastener at an acute angle to the main body of the connector, and the other of the pair of connectors in the assembled position receives a different fastener passing through the fastener opening of the nail guide of said other of the pair of connectors such that a portion of the shank of the different fastener is in contact with the guide way, the guide way positioning the shank of the different fastener at an acute angle to the main body of the connector.

7. The connection of claim 6, wherein:
the shank of the fastener passes through the main body of the connector, and also through the held member, such that a portion of the shank of the fastener is embedded in the holding member.

8. The connection of claim 6, wherein:
the inside face of each connector is in close registration with one of the longitudinal faces of the held member and the outside face of the main body is unobstructed; and
the nail guide projects inwardly and the guide way is formed with a raised embossed portion, the raised embossed portion having first and second bracketing transition areas where at least a portion of the embossed portion is joined to said main body, the raised embossed portion being embedded in the held member.

9. A connection comprising:
a held member having an end face and opposing planar longitudinal faces meeting said end face at opposing longitudinal edges of said end face;
a holding member having an attachment face with the end face of the held member in abutting relation to the attachment face of the holding member in an assembled position;
a pair of connectors, each connector comprising:
a planar main body attached to a respective one of the opposing longitudinal faces of the held member, the main body having an outside face and an opposed inside face with the inside face being in close registration with one of the longitudinal faces of the held member and the outside face of the main body being unobstructed, the main body having a inwardly projecting nail guide projecting from the inside face of the main body, the nail guide having a guide way protruding from the main body of the connector and a fastener opening associated with the guide way, the guide way being formed with a raised embossed portion having first and second bracketing transition areas where at least a portion of the embossed portion is joined to said main body, the raised embossed portion being embedded in the held member, and the main body having integral nail prong fasteners extending from the inside face that are embedded in the held member in a pre-assembled position and substantially spread over the main body, the integral nail prong fasteners being rigid members that extend away from the main body toward the held member and are bent orthogonally therefrom at the sides of openings in the main body; and
a planar end flange connected to the main body adjacent a respective one of the opposing longitudinal edges of said end face of the held member, with weakening openings disposed between the end flange and the main body, a distal edge of the end flange being formed with spaced-apart extending tabs that create notched areas between the tabs;

wherein in a first pre-assembled position, each of the end flanges is bent inwardly to a position which is closely adjacent to and parallel with said end face of said held member such that said end flange overlies and covers a portion of the end face of the held member, and such that the tabs of one said end flange are matingly received within the notched areas of the other said end flange;

wherein in a second assembled positon, each of the end flanges are bent outwardly to a position where each of the end flanges interfaces with the attachment face of the holding member, and each of the end flanges is connected to the holding member by one or more fasteners driven through the end flange and into the holding member; and one of the pairs of connectors in the assembled position receives a fastener passing through the main body of said one of the pair of connectors and the held member, such that a portion of a shank of the fastener is embedded in the holding member, the shank of the fastener passing through the fastener opening of the nail guide such that a portion of the shank of the fastener is in contact with the guide way, the guide way positioning the shank of the fastener at an acute angle to the main body of the connector, and the other of the pair of connectors in the assembled position receives a different fastener passing through the main body of said other of the pair of connectors and the held member, such that a portion of a shank of the different fastener is embedded in the holding member, the shank of the different fastener passing through the fastener opening of the nail guide such that a portion of the shank of the different fastener is in contact with the guide way, the guide way positioning the shank of the fastener at an acute angle to the mating body of the connector.

10. The connection of claim 9, wherein:
the raised embossed portion of the nail guide is shaped in a manner to assist in pressing the raised embossed portion into the held member.

11. A connection comprising:
a held member having an end face and opposing planar longitudinal faces meeting said end face at opposing longitudinal edges of said end face;

a holding member having an attachment face with the end face of the held member in abutting relation to the attachment face of the holding member in an assembled position; and
a pair of connectors, each connector comprising:
a planar main body attached to a respective one of the opposing longitudinal faces of the held member, the main body having an inside face and an outside face, the main body having integral nail prong fasteners extending from the inside face of the main body that are embedded in the held member in a pre-assembled position such that the connector is attached to the held member, the integral nail prong fasteners being substantially spread over the main body of the connector, the integral nail prong fasteners being rigid members that extend away from the main body toward the held member and are bent orthogonally from the main body at the sides of openings in the main body, and
a bendable, planar end flange connected to the main body adjacent a respective one of the opposing longitudinal edges of said end face of the held member, with weakening openings disposed between the end flange and the main body, a distal edge of the end flange being formed with spaced-apart extending tabs that create notched areas between the tabs;
wherein in a first pre-assembled position, each of the end flanges is bent inwardly to a position which is closely adjacent to and parallel with said end face of said held member such that said end flange overlies and covers a portion of the end face of the held member, and such that the tabs of one said end flange are matingly received within the notched areas of the other said end flange; and
wherein in a second assembled position, each of the bendable end flanges are bent outwardly to a position where it does not overlie the end face of the held member and it interfaces with the attachment face of the holding member, and each said end flange is connected to the holding member by one or more fasteners driven through the end flange and into the holding member.

12. A method of making a connection, comprising:
providing a held member having an end face and opposing planar longitudinal faces meeting said end face at opposing longitudinal edges of said end face;
providing a holding member having an attachment face with the end face of the held member in abutting relation to the attachment face of the holding member in an assembled position;
providing a pair of connectors, each said connector comprising:
a main body that interfaces with a respective one of the opposing longitudinal faces of the held member, the main body having an inside face and an outside face, the main body having integral nail prong fasteners extending from the inside face of the main body that are embedded in the held member in a pre-assembled position such that the connector is attached to the held member, the integral nail prong fasteners being substantially spread over the main body of the connector, the integral nail prong fasteners being rigid members that extend away from the main body toward the held member and are bent orthogonally from the main body at the sides of openings in the main body, the main body having a nail guide having a guide way protruding from the main body of the connector and a fastener opening associated with the guide way, the protruding guide way of the nail guide being pressed into the longitudinal face of the held member when the main body of the connector is attached to the held member, such that the guide way of the nail guide is embedded in the held member; and
a planar end flange connected to the main body adjacent a respective one of the opposing longitudinal edges of said end face of the held member, with weakening openings disposed between the end flange and the main body, a distal edge of the end flange being formed with spaced-apart extending tabs that create notched areas between the tabs;
in a first pre-assembled position, each of the end flanges being disposed inwardly and is closely adjacent to and parallel with said end face of said held member such that said end flange overlies and covers a portion of the end face of the held member, and such that the tabs of one said end flange are matingly received within the notched areas of the other said end flange;
in a second assembled position, bending each of the end flanges outwardly to a position where it does not overlie the end face of the held member and is in interfacing engagement with the attachment face of the held member;
placing the end face of the held member in abutting relation with the attachment face of the holding member;
driving a fastener through the nail guide of the main body of one of the pairs of connectors such that a shank of the fastener first passes through the fastener opening of the nail guide and then through the held member such that a portion of the shank of the fastener is embedded in the holding member;
driving a fastener through the nail guide of the main body of the other of the pairs of connectors such that a shank of the fastener first passes through the fastener opening of the nail guide and then through the held member such that a portion of the shank of the fastener is embedded in the holding member; and
attaching the end flange of each connector to the attachment face of the holding member by driving fasteners through the end flanges and into the holding member.

13. The method of claim 12, wherein:
the nail guide projects inwardly and the guide way is formed with a raised embossed portion, the raised embossed portion having first and second bracketing transition areas where at least a portion of the embossed portion is joined to said main body, the raised embossed portion being embedded in the held member; and
the inside face of the main body of each connector is in close registration with one of the longitudinal faces of the held member and the outside face of the main body is unobstructed.

* * * * *